(12) United States Patent
Zhao et al.

(10) Patent No.: US 8,649,606 B2
(45) Date of Patent: Feb. 11, 2014

(54) METHODS AND SYSTEMS FOR GENERATING SALIENCY MODELS THROUGH LINEAR AND/OR NONLINEAR INTEGRATION

(75) Inventors: Qi Zhao, South Pasadena, CA (US); Christof Koch, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 88 days.

(21) Appl. No.: 13/025,118

(22) Filed: Feb. 10, 2011

(65) Prior Publication Data

US 2011/0229025 A1  Sep. 22, 2011

Related U.S. Application Data

(60) Provisional application No. 61/303,225, filed on Feb. 10, 2010.

(51) Int. Cl.
 *G06K 9/66* (2006.01)
 *G06K 9/62* (2006.01)
 *A61N 1/00* (2006.01)

(52) U.S. Cl.
 USPC ............. 382/195; 382/159; 382/165; 607/54

(58) Field of Classification Search
 USPC ......... 382/103, 190, 195, 197, 159, 173, 165, 382/206, 248, 325; 607/54
 See application file for complete search history.

(56) References Cited

U.S. PATENT DOCUMENTS

| | | | |
|---|---|---|---|
| 5,210,799 A | 5/1993 | Rao | |
| 5,357,194 A | 10/1994 | Ullman et al. | |
| 5,566,246 A | 10/1996 | Rao | |
| 5,598,355 A | 1/1997 | Derou et al. | |
| 5,801,810 A | 9/1998 | Roenker | |
| 5,929,849 A | 7/1999 | Kikinis | |
| 5,983,218 A * | 11/1999 | Syeda-Mahmood | 707/769 |
| 5,984,475 A | 11/1999 | Galiana et al. | |
| 6,045,226 A | 4/2000 | Claessens | |
| 6,104,858 A * | 8/2000 | Suzuki | 386/207 |
| 6,320,976 B1 | 11/2001 | Murthy et al. | |
| 6,442,203 B1 | 8/2002 | Demos | |
| 6,670,963 B2 | 12/2003 | Osberger | |
| 6,720,997 B1 * | 4/2004 | Horie et al. | 348/218.1 |

(Continued)

FOREIGN PATENT DOCUMENTS

| | | |
|---|---|---|
| CN | 101489139 | 7/2009 |
| CN | 101601070 | 12/2009 |

(Continued)

OTHER PUBLICATIONS

Itti et al. "A Model of Saliency Based Visual Attention for Rapid Scene Analysis" IEEE Transactions on Pattern Analysis and Machine Intelligence vol. 20, No. 11, Nov. 1998 pp. 1254-1259.*

(Continued)

*Primary Examiner* — Chan S Park
*Assistant Examiner* — Mia M Thomas
(74) *Attorney, Agent, or Firm* — Steinfl & Bruno, LLP

(57) ABSTRACT

Methods and systems for generating saliency models are discussed. Saliency models can be applied to visual scenes to generate predictions on which locations in the visual scenes are fixation locations and which locations are nonfixation locations. Saliency models are learned from fixation data on the visual scenes obtained from one or more subjects.

20 Claims, 6 Drawing Sheets

(56) References Cited

U.S. PATENT DOCUMENTS

| | | | | |
|---|---|---|---|---|
| 7,027,054 | B1* | 4/2006 | Cheiky et al. | 345/473 |
| 7,620,267 | B2* | 11/2009 | Widdowson | 382/284 |
| 7,848,596 | B2* | 12/2010 | Widdowson | 382/294 |
| 8,396,249 | B1* | 3/2013 | Khosla et al. | 382/103 |
| 2002/0081033 | A1* | 6/2002 | Stentiford | 382/218 |
| 2002/0126891 | A1* | 9/2002 | Osberger | 382/165 |
| 2002/0154833 | A1* | 10/2002 | Koch et al. | 382/325 |
| 2005/0047647 | A1* | 3/2005 | Rutishauser et al. | 382/159 |
| 2005/0069206 | A1* | 3/2005 | Ma et al. | 382/190 |
| 2005/0084136 | A1* | 4/2005 | Xie et al. | 382/107 |
| 2005/0163344 | A1* | 7/2005 | Kayahara et al. | 382/103 |
| 2006/0215922 | A1* | 9/2006 | Koch et al. | 382/248 |
| 2007/0183669 | A1* | 8/2007 | Owechko et al. | 382/224 |
| 2009/0092314 | A1 | 4/2009 | Varshney et al. | |
| 2009/0110269 | A1 | 4/2009 | Le Meur et al. | |
| 2009/0112287 | A1 | 4/2009 | Greenberg et al. | |
| 2009/0226057 | A1* | 9/2009 | Mashiach et al. | 382/128 |
| 2009/0245625 | A1* | 10/2009 | Iwaki et al. | 382/159 |
| 2010/0268301 | A1* | 10/2010 | Parikh et al. | 607/54 |
| 2011/0175904 | A1* | 7/2011 | van Baar et al. | 345/419 |
| 2013/0084013 | A1* | 4/2013 | Tang | 382/195 |

FOREIGN PATENT DOCUMENTS

| | | |
|---|---|---|
| CN | 101697593 | 4/2010 |
| EP | 2034439 | 11/2009 |
| EP | 2136876 | 12/2009 |
| KR | 20080030604 | 4/2008 |
| KR | 20100013402 | 2/2010 |
| WO | 2007088193 | 8/2007 |
| WO | 2008/043204 | 4/2008 |
| WO | 2008040945 | 4/2008 |
| WO | 2008/109771 | 9/2008 |
| WO | 2010109419 | 9/2010 |

OTHER PUBLICATIONS

Tatler et al. "Visual Correlates of Fixation Selection: effects of scale and time" Vision Research Elsevier Nov. 2003 pp. 1-17.*
Andersen, R.A. (1997). Multimodal integration for the representation of space in the posterior parietal cortex. *Philosophical Transactions of the Royal Society of London, Series B: Biological Sciences*, 352, 1421-1428.
Andersen, R. A., Bracewell, R. M., Barash, S., Gnadt, J. W., & Fogassi, L. (1990). Eye position effects on visual, memory, and saccade-related activity in areas LIP and 7A of macaque. *Journal of Neuroscience*, 10, 1176-1196.
Beymer, D., & Poggio, T. (1996). Image representations for visual learning. *Science*, 272, 1905-1909.
Braun, J., & Sagi, D. (1990). Vision outside the focus of attention. *Perception and Psychophysics*, 48, 45-58.
Braun, J. (1998). Vision and attention: the role of training (letter; comment). *Nature*, 393, 424-425.
Cannon, M. W., & Fullenkamp, S. C. (1991). Spatial interactions in apparent contrast: inhibitory effects among grating patterns of different spatial frequencies, spatial positions and orientations. *Vision Research*, 31, 1985-1998.
Colby, C. L., & Goldberg, M. E. (1999). Space and attention in parietal cortex. Annual Review of Neuroscience, 22, 319-349.
Corbetta, M. (1998). Frontoparietal cortical networks for directing attention and the eye to visual locations: identical, independent, or overlapping neural systems? Proceedings of the National Academy of Sciences of the United States of America, 95, 831-838.
Crick, F., & Koch, C. (1998). Constraints on cortical and thalamic projections: the no-strong-loops hypothesis. Nature, 391, 245-250.
Desimone, R., & Duncan, J. (1995). Neural mechanisms of selective visual attention. Annual Review of Neuroscience, 18, 193-222.
DeValois, R. L., Albrecht, D. G., & Thorell, L. G. (1982). Spatial-frequency selectivity of cells in macaque visual cortex. Vision Research, 22, 545-559.

Driver, J., Mcleod, P., & Dienes, Z., Motion coherence and conjunction search: Implications for guided search theory. Perception and Psychophysics, 1992, 51, 79-85.
Engel, S., Zhang, X., & Wendell, B. (1997). Colour tuning in human visual cortex measured with functional magnetic resonance imaging. Nature, 388, 68-71.
Gallant, J. L., Connor, C. E., & Essen, D. C. V. (1998). Neural activity in areas VI, V2 and V4 during free viewing of natural scenes compared to controlled viewing. Neuroreport, 9, 1673-1678.
Gilbert, C. D., & Wiesel, T. N. (1983). Clustered intrinsic connections in cat visual cortex. Journal of Neuroscience, 3, 1116-1133.
Gilbert, C. D., & Wiesel, T. N. (1989). Columnar specificity of intrinsic horizontal and corticocortical connections in cat visual cortex. Journal of Neuroscience, 9, 2432-2442.
Gilbert, C. D., Das, A., Ito, M., Kapadia, M., & Westheimer, G. (1996). Spatial integration and cortical dynamics. Proceedings of the National Academy of Sciences of the United States of America, 93, 615-622.
Gottlieb, J. P., Kusunoki, M., & Goldberg, M. E. (1998). The representation of visual salience in monkey parietal cortex. Nature, 391, 481-484.
Greenspan, H., Belongie, S., Goodman, R., Perona, P., Rakshit, S., & Anderson, C. H. (1994). Overcomplete steerable pyramid filters and rotation invariance. In Proc. IEEE Computer Vision and Pattern Recognition (CVPR), Seattle, WA (June), 222-228.
Hamker, F. H. (1999). The role of feedback connections in task driven visual search. In D. von Heinke, G. W. Humphreys, & A. Olson, Connectionist Models in Cognitive Neuroscience, Proc. of the 5th neural computation and psychology workshop (NCPW'98). London: Springer-Verlag, 252-261.
Hikosaka, O., Miyauchi, S., & Shimojo, S. (1996). Orienting a spatial attention—its reflexive, compensatory, and voluntary mechanisms. Brain Research and Cognitive Brain Research, 5, 1-9.
Hillstrom, A. P., & Yantis, S. (1994). Visual motion and attentional capture. Perception and Psychophysics, 55, 399-411.
Horiuchi, T., Morris, T., Koch, C. & DeWeerth, S., 1997. Analog VLSI circuits for attention-based, visual tracking. In M. Mozer, M. Jordan, & T. Petsche, Neural information processing systems (NIPS*9) (706-712). Cambridge, MA: MIT Press.
Horowitz, T. S., & Wolfe, J. M. (1998). Visual search has no memory. Nature, 394, 575-577.
Itti, L. et al., A comparison of feature combination strategies for saliency-based visual attention, in SPIE Human Vision and Electronic Imaging IV, San Jose, CA 1999 (in press), 1-10.
Knierim, J. J., & van Essen, D. C. (1992). Neuronal responses to static texture patterns in area VI of the alert macaque monkey. Journal of Neurophysiology, 67, 961-980.
Koch, C. et al. (1985). Shifts in selective visual attention: towards the underlying neural circuitry. Human Neurobiology, 4, 219-227.
Kustov, A. A., & Robinson, D. L. (1996). Shared neural control of attentional shifts and eye movements. Nature, 384, 74-77.
Kwak, H. W., & Egeth, H. (1992). Consequences of allocating attention to locations and to other attributes. *Perception and Psychophysics*, 51, 455-464.
Laberge, D., & Buchsbaum, M. S. (1990). Positron emission tomographic measurements of pulvinar activity during an attention task. *Journal of Neuroscience*, 10, 613-619.
Lee, D. K., Itti, L., Koch, C., & Braun, J. (1999). Attention activates winner-take-all competition among visual filters. *Nature Neuroscience*, 2, 375-381.
Levitt, J. B., & Lund, J. S. (1997). Contrast dependence of contextual effects in primate visual cortex. *Nature*, 387, 73-76.
Luschow, A., & Nothdurft, H. C. (1993). Pop-out of orientation but no pop-out of motion at isoluminance. *Vision Research*, 33, 91-104.
Malach, R. (1994). Cortical columns as devices for maximizing neuronal diversity. *Trends in Neuroscience*, 17, 101-104.
Malach, R., Amir, Y., Harel, M., & Grinvald, A. (1993). Relationship between intrinsic connections and functional architecture revealed by optical imaging and in vivo targeted biocytin injections in primate striate cortex. *Proceedings of the National Academy of Sciences of the United States of America*, 90, 10469-10473.

(56) References Cited

OTHER PUBLICATIONS

Malik, J., & Perona, P. (1990). Preattentive texture discrimination with early vision mechanisms. *Journal of the Optical Society of America A*, 7, 923-932.

Motter, B. C., & Belky, E. J. (1998). The guidance of eye movements during active visual search. *Vision Research*, 38, 1805-1815.

Nakayama, K., & Mackeben, M. (1989). Sustained and transient components of focal visual attention. *Vision Research*, 29, 1631-1647.

Niebur, E., & Koch, C. (1996). Control of selective visual attention: modeling the 'where' pathway. In D. Touretzky, M. Mozer, & M. Hasselmo, *Neural information processing systems* (NIPS 8), (802-808). Cambridge, MA: MIT Press.

Niebur, E., & Koch, C. (1998). Computational architectures for attention. In R. Parasuraman, *The attentive brain* (pp. 163-186). Cambridge, MA: MIT Press.

Niyogi, P., Girosi, F., & Poggio, T. (1998). Incorporating prior information in machine learning by creating virtual examples. *Proceedings of the IEEE*, 86, 2196-2209.

Noton, D., & Stark, L. (1971). Scanpaths in eye movements during pattern perception. *Science*, 171, 308-311.

O'Regan, J. K., Rensink, R. A., & Clark, J. J. (1999). Change-blindness as a result of 'mudsplashes'. *Nature*, 398, 34.

Olshausen, B. A., Anderson, C. H., & Van Essen, D. C. (1993). A neurobiological model of visual attention and invariant pattern recognition based on dynamic routing of information. *Journal of Neuroscience*, 13, 4700-4719.

Poggio, T. (1997). Image representations for visual learning. *Lecture Notes in Computer Science*, 1206, 143. (Abstract Only).

Polat, U., & Sagi, D. (1994). The architecture of perceptual spatial interactions. *Vision Research*, 34, 73-78.

Polat, U., & Sagi, D. (1994). Spatial interactions in human vision: from near to far via experience-dependent cascades of connections. *Proceedings of the National Academy of Sciences of the United States of America*, 91, 1206-1209.

Rao, R. P. N., & Ballard, D. H. (1995). An active vision architecture based on iconic representations. *Artificial Intelligence*, 78, 461-505.

Robinson, D. L., & Petersen, S. E. (1992). The pulvinar and visual salience. *Trends in Neuroscience*, 15, 127-132.

Rockland, K. S., & Lund, J. S. (1983). Intrinsic laminar lattice connections in primate visual cortex. *Journal of Comparative Neurology*, 216, 303-318.

Rockland, K. S., Andresen, J., Cowie, R. J., & Robinson, D. L. (1999). Single axon analysis of pulvinocortical connections to several visual areas in the macaque. *Journal of Comparative Neurology*, 406, 221-250.

Saarinen, J., & Julesz, B. (1991). The speed of attentional shifts in the visual field. Proceedings of the National Academy of Sciences of the United States of America, 88, 1812-1814.

Sheliga, B. M., Riggio, L., & Rizzolatti, G. (1994). Orienting of attention and eye movements. *Experimental Brain Research*, 98, 507-522.

Shepherd, M., Findlay, J. M., & Hockey, R. J. (1986). The relationship between eye movements and spatial attention. *Quarterly Journal of Experimental Psychology*, 38, 475-491.

Sillito, A. M., & Jones, H. E. (1996). Context-dependent interactions and visual processing in V1. *Journal of Physiology Paris*, 90, 205-209.

Simoncelli, E. P., Freeman, W. T., Adelson, E. H., & Heeger, D. J. (1992). Shiftable multiscale transforms. *IEEE Transactions on Information Theory*, 38, 587-607.

Tootell, R. B., Hamilton, S. L., Silverman, M. S., & Switkes, E. (1988). Functional anatomy of macaque striate cortex. i. ocular dominance, binocular interactions, and baseline conditions. *Journal of Neuroscience*, 8, 1500-1530.

Treisman, A., & Gormican, S. (1988). Feature analysis in early vision: evidence from search asymmetries. *Psychology Review*, 95, 15-48.

Ts'o, D. Y., Gilbert, C. D., & Wiesel, T. N. (1986). Relationships between horizontal interactions and functional architecture in cat striate cortex as revealed by cross-correlation analysis. *Journal of Neuroscience*, 6, 1160-1170.

Wagenaar, W. A. (1969). Note on the construction of digram-balanced latin squares. *Psychology Bulletin*, 72, 384-386.

Weliky, M., Kandler, K., Fitzpatrick, D., & Katz, L. C. (1995). Patterns of excitation and inhibition evoked by horizontal connections in visual cortex share a common relationship to orientation columns. *Neuron*, 15, 541-552.

Wolfe, J. M. (1994). Visual search in continuous, naturalistic stimuli. *Vision Research*, 34, 1187-1195.

Yuille, A. L., & Grzywacz, N. M. (1989). A mathematical-analysis of the motion coherence theory. *International Journal of Computer Vision*, 3, 155-175.

Zenger, B., & Sagi, D. (1996). Isolating excitatory and inhibitory nonlinear spatial interactions involved in contrast detection. *Vision Research*, 36, 2497-2513.

J.M. Wolfe, "Guided Search 2.0: A Revised Model of Visual Search," *Psychonomic Bull. Rev.*, vol. 1, pp. 202-238 (1994).

P. Reinagel and A.M. Zador, "Natural Scene Statistics at the centre of gaze," *Network: Computation in Neural Systems*, vol. 10, pp. 1-10 (1999).

I. Kovacs and B. Julesz, "A Closed Curve is Much More Than an Incomplete One: Effect of Closure in Figure-Ground Segmentation," *Proc. Nat'l Academy of Sciences, U.S.A.*, vol. 90, No. 16, pp. 7,495-7,497 (Aug. 1993).

S. Baluja and D.A. Pomerleau, "Expectation-Based Selective Attention for Visual Monitoring and Control of a Robot Vehicle," *Robotics and Autonomous Systems*, vol. 22, No. 3-4, pp. 329-344 (Dec. 1997).

M.W. Cannon and S.C. Fullenkamp, "A Model for Inhibitory Lateral Interaction Effects in Perceived Contrast," *Vision Res.*, vol. 36, No. 8, pp. 1,115-1,125 (Apr. 1996).

R. Milanese, S. Gil, and T. Pun, "Attentive Mechanisms for Dynamic and Static Scene Analysis," *Optical Eng.*, vol. 34, No. 8, pp. 2,428-2,434 (Aug. 1995).

M.I. Posner and Y. Cohen, "Components of Visual Orienting," H. Bouma and D.G. Bouwhuis, eds., *Attention and Performance*, vol. 10, pp. 531-556. Hilldale, N.J.: Erlbaum (1984).

Parkhurst, D. et al., K. Law, and E. Niebur, "Modeling the role of salience in the allocation of overt visual attention," *Vision Research*, vol. 42, No. 1, pp. 107-123, 2002.

M. Cerf, D. Cleary, R. Peters, W. Einhauser, and C. Koch, "Observers are consistent when rating image conspicuity," *Vision Research*, vol. 47, pp. 3052-3060, 2007.

Foulsham, T. et al., "What can saliency models predict about eye movements? Spatial and sequential aspects of fixations during encoding and recognition," *Journal of Vision*, vol. 8, No. 2, pp. 1-17, 2008.

Oliva, A. et al., "Top-down control of visual attention in object detection," in *International Conference on Image Processing*, 2003, pp. I:253-I:256.

S. Dickinson, H. Christensen, J. Tsotsos, and G. Olofsson, "Active object recognition integrating attention and viewpoint control," in *European Conference on Computer Vision*, 1994, pp. 3-14.

Itti, L. et al., C. Koch, and E. Niebur, "A model for saliency-based visual attention for rapid scene analysis," *IEEE Trans. Pattern Analysis and Machine Intelligence*, vol. 20, No. 11, pp. 1254-1259, 1998.

Itti, L. et al., "A saliency-based search mechanism for overt and covert shifts of visual attention," *Vision Research*, vol. 40, pp. 1489-1506, 2000.

W. Einhauser, U. Rutishauser, E. Frady, S. Nadler, P. Konig, and C. Koch, "The relation of phase noise and luminance contrast to overt attention in complex visual stimuli," *Journal of Vision*, vol. 6, No. 11, pp. 1:1148-1:1158, 2006.

M. Cerf, E. Frady, and C. Koch, "Faces and text attract gaze independent of the task: Experimental data and computer model," *Journal of Vision*, vol. 9, No. 12, pp. 10:1-10:15, 2009.

M. Donk and W. van Zoest, "Effects of salience are short-lived," *Psychological Science*, vol. 19, No. 7, pp. 733-739, 2008.

Masciocchi, C. et al., "Everyone knows what is interesting: Salient locations which should be fixated," *Journal of Vision*, vol. 9, No. 11, pp. 25:1-25:22, 2009.

(56) References Cited

OTHER PUBLICATIONS

Itti, L., Models of bottom-up attention and saliency, In L. Itti, G. Rees, & J.K. Tsotsos (Eds.), *Neurobiology of attention*, 2005 (pp. 576-582). Elsevier.
L. Itti and P. Baldi, "Bayesian surprise attracts human attention," in *Advances in Neural Information Processing Systems*, 2006, pp. 547-554.
Bruce N. et al., "Saliency based on information maximization," in *Advances in Neural Information Processing Systems*, 2006, pp. 155-162.
Harel, J. et al., "Graph-based visual saliency," in *Advances in Neural Information Processing Systems*, 2007, pp. 545-552.
Nothdurft, H.,"Salience from feature contrast: Additivity across dimensions," *Vision Research*, vol. 40, pp. 1183-1201, 2000.
Hou, X., & Zhang, L. (2008). Dynamic visual attention: searching for coding length increments. In *Advances in neural information processing systems*. (pp. 1-8).
Y. Freund and R. Schapire, "Game theory, on-line prediction and boosting," in *Conference on Computational Learning Theory*, 1996, pp. 325-332.
J. Friedman, T. Nestle, and R. Tibshirani, "Additive logistic regression: A statistical view of boosting," *The Annals of Statistics*, vol. 28, No. 2, pp. 337-374, 2000.
R. Schapire and Y. Singer, "Improved boosting algorithms using confidence-rated predictions," *Machine Learning*, vol. 37, No. 3, pp. 297-336, 1999.
A. Vezhnevets and V. Vezhnevets, "Modest adaboost—teaching adaboost to generalize better," in *Graphicon*, pp. 1-4, 2005.
M. Cerf, J. Harel, W. Einhauser, and C. Koch, "Predicting human gaze using low-level saliency combined with face detection," in *Advances in Neural Information Processing Systems*, 2008, pp. 241-248.
Gao, D., Mahadevan, V., & Vasconcelos, N. (2007). The discriminant center-surround hypothesis for bottom-up saliency. In *Advances in neural information processing systems* (pp. 497-504).
D. Brainard, "The psychophysics toolbox," *Spatial Vision*, vol. 10, No. 4, pp. 433-436,1997.
F. Cornelissen, E. Peters, and J. Palmer, "The eyelink toolbox: Eye tracking with matlab and the psychophysics toolbox," *Behavior Research Methods, Instruments and Computers*, vol. 34, No. 4, pp. 613-617, 2002.
Y. Rubner, C. Tomasi, and L. Guibas, "The earth mover's distance as a metric for image retrieval," *International Journal of Computer Vision*, vol. 40, No. 2, pp. 99-121, 2000.
R. Peters, A. Iyer, L. Itti, and C. Koch, "Components of bottom-up gaze allocation in natural images," *Vision Research*, vol. 45, No. 18, pp. 2397-2416, 2005.
Koene, A. et al., "Feature-specific interactions in salience from combined feature contrasts: Evidence for a bottom-up saliency map in v1," *Journal of Vision*, vol. 7, No. 7, pp. 6:1-6:14, 2007.
Bruce, N. et al., (2009). Saliency, attention, and visual search: An information theoretic approach. *Journal of Vision*, 9(3), 1-24.
Chikkerur, S., Serre, T., Tan, C., & Poggio, T. (2010). What and where: A Bayesian inference theory of attention. *Vision Research*, 50(22), 2233-2247.
Einhäuser, W. et al., Objects predict fixations better than early saliency, Journal of Vision, 2008, vol. 8(14), pp. 1-26.
Jin, R., Liu, Y., Si, L., Carbonell, J., & Hauptmann, A.G. (2003). A new boosting algorithm using input-dependent regularizer. In International Conference on Machine Learning. pp. 1-9.
Judd, T., Ehinger, K., Durand, F., & Torralba, A. (2009). Learning to predict where humans look. In IEEE international conference on computer vision. pp. 2106-2113.
Kienzle, W., Wichmann, F., Scholkopf, B., Franz, M. (2006). A nonparametric approach to bottom-up visual saliency. In Advances in neural information processing systems (pp. 689-696).
Krieger, G., Rentschler, I., Hauske, G., Schill, K., & Zetzsche, C. (2000). Object and scene analysis by saccadic eye movements: An investigation with higher-order statistics. *Spatial Vision*, 13(2-3), pp. 201-214.

Li, Z. (2002). A saliency map in primary visual cortex. *Trends in Cognitive Sciences*, 6(1), pp. 9-16.
Navalpakkam, V., & Itti, L. (2005). Modeling the influence of task on attention. *Vision Research*, 45(2), pp. 205-231.
Rutishauser, U., & Koch, C. (2007). Probabilistic modeling of eye movement data during conjunction search via feature-based attention. *Journal of Vision*, 7(6), pp. 1-20.
Subramanian, R., Katti, H., Sebe, N., Kankanhalli, M. & Chua, T. S. (2010). An eye fixation database for saliency detection in images. *European Conference on Computer Vision*, (pp. 6314:30-6314:43).
Treisman, A. M., & Gelade, G. (1980). A feature-integration theory of attention. *Cognitive Psychology*, 12(1), pp. 97-136.
Viola, P. et al., (2001). Rapid object detection using a boosted cascade of simple features. In *Computer Vision and Pattern Recognition* (pp. 1:511-1:518).
Walther, D. et al., (2005). Modeling feature sharing between object detection and top-down attention. *Journal of Vision*, 5(8), pp. 1041-1041.
Lang, P., Bradley, M., & Cuthbert, B. (2008). (IAPS): Affective ratings of pictures and instruction manual. *Technical report, University of Florida*. pp. 1-61.
Fixations in Faces, DataBase, webpage retrieved on Feb. 24, 2012, http://www.fifadb.com.
Restriction Requirement issued for U.S. Appl. No. 11/430,684, filed May 8, 2006 in the name of Christof Koch; mail date: Jul. 23, 2009.
Final Office Action issued for U.S. Appl. No. 11/430,684, filed May 8, 2006 in the name of Christof Koch; mail date: Apr. 28, 2010.
Advisory Action issued for U.S. Appl. No. 11/430,684, filed May 8, 2006 in the name of Christof Koch; mail date: Jun. 7, 2010.
Non-Final Office Action issued for U.S. Appl. No. 11/430,684, filed May 8, 2006 in the name of Christof Koch; mail date: Mar. 22, 2011.
Non-Final Office Action issued for U.S. Appl. No. 11/430,684, filed May 8, 2006 in the name of Christof Koch; mail date: Nov. 10, 2009.
PCT International Search Report for PCT/US2011/024414 with a mailing date of Nov. 11, 2011.
PCT Written Opinion for PCT/US2011/024414 with a mailing date of Nov. 11, 2011.
Adelson, E.H. et al. Spatio-temporal energy models for the perception of motion, *J. Opt. Soc. Am.* A2: 284-299, 1985.
Bergen, J.R. et al. "Parallel versus serial processing in rapid pattern discrimination", *Nature*, 303, p. 696-8, 1983.
Bijl, P. et al., Visual search performance for realistic target imagery from DISSTAF field trials. Soesterberg, The Netherlands: *TNO Human Factors Research Institute*. 1997.
Braun, J., Julesz, B., Withdrawing attention at little or no cost: detection and discrimination tasks. *Percept Psychophys*, 60, pp. 1-23, 1998.
Burt, P. et al., "The laplacian pyramid as compact image code", *IEEE Trans on Comm*, 31, pp. 532-540, 1983.
Itti L., Koch C., Braun J., "Revisiting spatial vision: toward a unifying model", *J Opt Soc Am A Opt Image Sci Vis*, 17(11), pp. 1899-1917, 2000.
McClurkin, J.W., Gawne, T.J., Richmond, B.J., Optican, L.M., Robinson, D.L., "Lateral geniculate neurons in behaving primates. I. Responses to two-dimensional stimuli", *J Neurophysiol*, 66(3), pp. 777-793, 1991.
Posner, M.I., Cohen, Y., Rafal R.D., "Neutral systems of control of spatial orienting", *Philos Trans B Soc Lond B Biol Sci*, 298: 187-198. 1982.
Rensink, R.A. et al., To see or not to see: The need for attention to perceive changes in scences, *Psychological Sci.* 8: 368-373, 1997.
Reinagel, P., A.M. Zador, "The effect of gaze on natural scene statistics," *Neural Information and Coding Workshop*, Snowbird, Utah, Mar. 16-20, 1997.
Riesenhuber, M. and Poggio, T., Models of object recognition. *Nature Neuroscience* 3: 1199-1204, 2000.
Sillito, A.M. et al., Visual cortical mechanisms detecting focal orientation discontinuities, *Nature*, 378, pp. 492-496, 1995.
Simons, D.J. et al., Failure to detect changes to attended objects. *Invest. Opt. and Vis. Science*, 38, 3273. 1997.
Toet, A. et al., A high-resolution image dataset for testing search and detection models (Report TNO-TM-98-A020), *TNO Human Factors Research Institute*, Soesterberg, The Netherlands, 1998.

(56) References Cited

OTHER PUBLICATIONS

Treisman, A., "Features and objects: the fourteenth Bartlett memorial lecture", Q J Exp Psychol [A], 40, pp. 201-237, 1998.
Tsotsos, J.K. et al. "Modeling visual-attention via selective tuning", *Artif Intell*, 78, pp. 507-545, 1995.
Yarbus, A.L., Eye movements and vision, *Plenum Press*, New York, USA, 1967.
Restriction Requirement issued for U.S. Appl. No. 09/912,225, filed Jul. 23, 2001; mail date: Sep. 7, 2004.
Non-Final Office Action issued for U.S. Appl. No. 09/912,225, filed Jul. 23, 2001; mail date: Mar. 9, 2005.
Final Office Action issued for U.S. Appl. No. 09/912,225, filed Jul. 23, 2001; mail date: Jul. 13, 2005.
Advisory Action issued for U.S. Appl. No. 09/912,225, filed Jul. 23, 2001; mail date: Oct. 31, 2005.
Non-Final Office Action issued for U.S. Appl. No. 09/912,225, filed Jul. 23, 2001; mail date: Dec. 15, 2005.
Notice of Allowance issued for U.S. Appl. No. 09/912,225, filed Jul. 23, 2001; mail date: Mar. 29, 2006.
Notice of Abandonment issued for U.S. Appl. No. 09/912,225, filed Jul. 23, 2001; mail date: Aug. 3, 2006.
Koch, C. Biophysics of Computation: Information Processing in Single Neurons. Oxford University Press, New York, NY, 1999, pp. 142-144 and 335-341.
Gill, P. et al., Practical Optimization. Academic Press, London, UK, 1981, pp. 167-175.
Levin, D.T. et al., Failure to detect changes to attended objects in motion pictures, Psychonomic Bulletin & Review, 1997, 4(4), pp. 501-505.
Toet, A. et al., Image dataset for testing search and detection models, Opt. Eng., Sep. 2001, vol. 40, Issue 9, pp. 1760-1767.
Reinagel, P. et al., Natural scene statistics at the centre of gaze, Network: *Comput, Neural Syst.* 10 (1999) pp. 341-350.
Non-Final Office Action mailed on Dec. 20, 2012 for U.S. Appl. No. 13/324,352, filed Dec. 13, 2011 in the name of Christof Koch et al.
Notice of Allowance mailed on Apr. 24, 2013 for U.S. Appl. No. 13/324,352, filed Dec. 13, 2011 in the name of Christof Koch et al.

\* cited by examiner

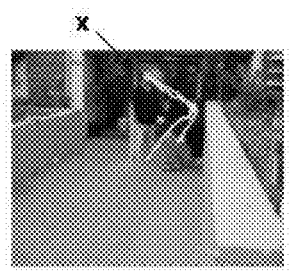
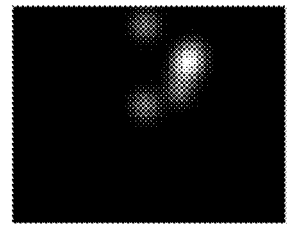
FIG. 4A            FIG. 4B
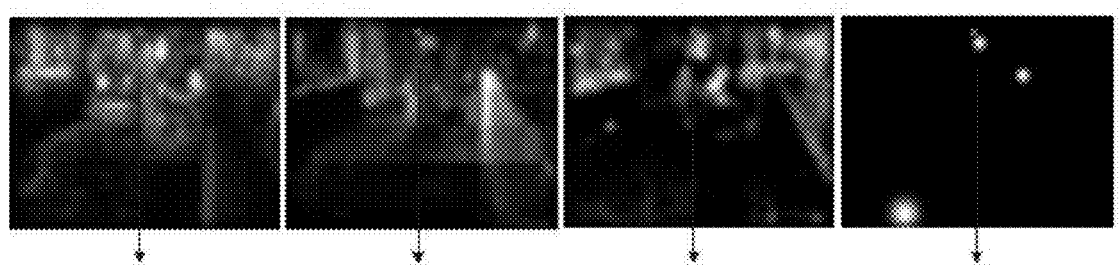
f(x) = [C(x)        I(x)        O(x)        F(x)]ᵀ
FIG. 4C

METHODS AND SYSTEMS FOR GENERATING SALIENCY MODELS THROUGH LINEAR AND/OR NONLINEAR INTEGRATION

CROSS REFERENCE TO RELATED APPLICATIONS

The present application claims priority to U.S. Provisional Application No. 61/303,225, entitled "Combining the Saliency Map Approach with Adaboost Improves Predictability of Eye Movements in Natural Scenes", filed on Feb. 10, 2010, incorporated herein by reference in its entirety. The present application may be related to U.S. application Ser. No. 11/430,684 entitled "Computation of Intrinsic Perceptual Saliency in Visual Environments, and Applications", filed on May 8, 2006, incorporated herein by reference in its entirety.

STATEMENT OF GOVERNMENT GRANT

This invention was made with government support under Grant No. HR0011-10-C-0034 awarded by DARPA and Grant No. N00014-10-1-0278 awarded by the Office of Naval Research. The government has certain rights in the invention.

FIELD

The disclosure relates generally to saliency models. More specifically, it relates to methods and systems for generating saliency models through linear and/or nonlinear integration.

BACKGROUND

Humans and other primates move their eyes to select visual information from a visual scene. This eye movement allows them to direct the fovea, which is the high-resolution part of their retina, onto relevant parts of the visual scene, thereby allowing processing of relevant visual information and allowing interpretation of complex scenes in real time.

Commonalities between fixation patterns in synthetic or natural scenes from different individuals allow forming of computational models for predicting where people look in a visual scene (see references [1], [2], [3], and [4], incorporated herein by reference in their entireties). There are several models inspired by putative neural mechanisms for making such predictions (see reference [5], incorporated herein by reference in its entirety). One sensory-driven model of visual attention focuses on low-level features of a visual scene to evaluate salient areas of the visual scene. By way of example and not of limitation, low-level features generally refer to color, intensity, orientation, texture, motion, and depth present in the visual scene.

With origins in *Feature Integration Theory* by Treisman and Gelade in 1980 (see reference [45], incorporated herein by reference in its entirety) and a proposal by Koch and Ullman (see reference [38], incorporated herein by reference in its entirety) for a map of a primate visual system that encodes extent to which any location in a given subject's field of view is conspicuous or salient, a series of ever refined models have been designed to predict where subjects will fixate their visual attention in synthetic or natural scenes (see references [1], [3], [4], [6], and [7], incorporated herein by reference in their entireties) based on bottom-up, task-independent factors (see references [31] and [47], incorporated herein by reference in their entireties).

As used here, a "task" refers to a visual task that a subject may have in mind while viewing a visual scene. For instance, the subject may be given an explicit task or may give himself/herself an arbitrary, self-imposed task to "search for a red ball" in a visual scene. By viewing the visual scene with the task in mind (in this example, searching for red balls in the visual scene), the subject's viewing of the visual scene will be dependent on the particular task.

Bottom-up, task independent factors are those factors found in the visual scene that attract a subject's attention strongly and rapidly, independent of tasks the subject is performing. These bottom-up factors depend on instantaneous sensory input and usually relate to properties of an input image or video.

Bottom-up factors are in contrast to top-down factors, which take into account internal states of the subject such as goals of the subject at the time of viewing and personal experiences of the subject. An example of a goal would be that provided in the previous example of searching for a red ball, where the subject views the visual scene with a particular emphasis (or goal) on finding a red ball. An example of a personal experience would be if, upon seeing one piece of furniture in the visual scene, the subject's personal experience tells the subject to search for other pieces of furniture because the visual scene is likely to be displaying an interior of a building.

As another example, a top-down factor can involve storing an image of a face of a specific person that a subject is searching for and correlating the image of the face across an entire visual scene. Correlating refers to matching a feature (the face from the image in this example) at different locations of the visual scene. A high correlation would correspond with a location where the feature is likely to be located.

In these prediction models (see references [1], [6], and [7]), information on low-level features of any visual scene (such as color, intensity, and orientation) are combined to produce feature maps through center-surround filtering across numerous spatial scales (see references [1] and [6]). These feature maps across numerous spatial scales are normalized and combined to create an overall saliency map of the visual scene, which predicts human fixations significantly above chance (see reference [7]).

SUMMARY

According to a first aspect of the disclosure, a method for generating a saliency model from one or more images is provided, the saliency model adapted to predict whether a particular location in an image is a fixation location or a nonfixation location, the method comprising: providing visual fixation data from one or more subjects, wherein the visual fixation data comprises information on whether each location in the one or more images viewed by the one or more subjects is a fixation location or a nonfixation location; constructing one or more visual fixation maps based on the visual fixation data; providing a plurality of feature channels, wherein each feature channel detects a particular feature in the one or more images; constructing a plurality of conspicuity maps, wherein each conspicuity map is associated with one feature channel in the plurality of feature channels, and wherein a particular conspicuity map is constructed based on features detected by a feature channel associated with the particular conspicuity map; and generating a plurality of weights, wherein the plurality of weights is a function of the one or more visual fixation maps and the plurality of conspicuity maps, thus generating the saliency model, wherein each weight is associated with one conspicuity map in the plurality of conspicuity maps.

According to a second aspect of the disclosure, a method for generating a saliency model from one or more images is provided, the saliency model adapted to predict whether a particular location in an image is a fixation location or a nonfixation location, the method comprising: providing visual fixation data from one or more subjects, wherein the visual fixation data comprises information on whether each location in the one or more images viewed by the one or more subjects is a fixation location or a nonfixation location; selecting a first plurality of locations in the one or more images, wherein each location in the first plurality of locations is a fixation location; selecting a second plurality of locations in the one or more images, wherein each location in the second plurality of locations is a nonfixation location; setting sample weights applied to each location in the first and second plurality of locations to a common value; providing a plurality of feature channels, wherein each feature channel detects a particular feature in the one or more images; generating a plurality of relevant maps for each feature channel based on features detected by each feature channel, wherein a feature value at each location in a particular relevant map is based on features detected by a feature channel associated with the particular relevant map; selecting a relevant map from among the plurality of relevant maps that minimizes weighted classification errors for the first and second plurality of locations, wherein a classification error occurs when a relevant map indicates that a particular location in the first plurality of locations is a nonfixation location or when a relevant map indicates that a particular location in the second plurality of locations is a fixation location, and wherein each classification error is multiplied with the sample weight associated with the particular location to form a weighted classification error; generating a thresholded relevant map for the selected relevant map, wherein a value associated with a particular location in the thresholded relevant map is either a first value or a second value, and wherein the value associated with the particular location is based on the feature value at the particular location in the selected relevant map; calculating a relevance weight applied to the selected relevant map based on the classification errors associated with the selected relevant map; adjusting the sample weights applied to each location in the first and second plurality of locations based on the relevance weight and the classification errors associated with the selected relevant map; iteratively performing the relevant map selecting, the relevance weight calculating, and the sample weight adjusting for a pre-defined number of times; and generating the saliency model based on a sum of a product between each relevance weight and the thresholded relevant map corresponding to the selected relevant map corresponding to the relevance weight.

According to a third aspect of the disclosure, a system for generating a saliency model from one or more images is provided, the saliency model adapted to predict whether a particular location in an image is a fixation location or a nonfixation location, the system adapted to receive visual fixation data from one or more subjects, the system comprising: a visual fixation data mapping module configured to generate one or more visual fixation maps based on the visual fixation data, wherein the visual fixation data comprises information on whether each location in the one or more images viewed by the one or more subjects is a fixation location or a nonfixation location; a feature detection module comprising a plurality of feature channels, wherein each feature channel detects a particular feature in the one or more images; a conspicuity map generating module for conspicuity map construction for each feature channel based on features detected by the feature detection module for each feature channel, wherein the conspicuity map generating module is adapted to receive information for each feature channel from the feature detection module and is adapted to output a plurality of conspicuity maps; a weight computation module for generation of a plurality of weights, wherein the plurality of weights is a function of the one or more visual fixation maps from the visual fixation data mapping module and the plurality of conspicuity maps from the conspicuity map generating module, thus generating the saliency model, wherein each weight in the plurality of weights is associated with one conspicuity map in the plurality of conspicuity maps.

According to a fourth aspect of the disclosure, a system for generating a saliency model from one or more images is provided, the saliency model adapted to predict whether a particular location in an image is a fixation location or a nonfixation location, the system adapted to receive visual fixation data from one or more subjects, the system comprising: a visual fixation data mapping module configured to generate one or more visual fixation maps based on the visual fixation data, wherein the visual fixation data comprises information on whether each location in one or more images viewed by the one or more subjects is a fixation location or a nonfixation location; a sampling module for selection of a first plurality of locations in the one or more images and a second plurality of locations in the one or more images, wherein each location in the first plurality of locations is a fixation location and each location in the second plurality of locations is a nonfixation location; a feature detection module comprising a plurality of feature channels, wherein each feature channel detects a particular feature in the one or more images; a map generating module for map construction for each feature channel based on features detected by the feature detection module for each feature channel, wherein the map generating module is adapted to receive information for each feature channel from the feature detection module and is adapted to output a plurality of relevant maps, and wherein a feature value at each location in a particular relevant map is based on features detected by a feature channel associated with the particular relevant map; a map selecting module for selection of one or more relevant maps from among the plurality of relevant maps based on classification errors, wherein a classification error occurs when a relevant map indicates that a particular location in the first plurality of locations is a fixation location or when a relevant map indicates that a particular location in the second plurality of locations is a nonfixation location, and wherein the selected relevant maps are associated with minimum weighted classification errors, wherein each classification error is multiplied with the sample weight associated with the particular location to form a weighted classification error; sample weighting module for iterative setting and adjustment of sample weights, wherein a weight initially applied to each location in the first and second plurality of locations is a common value, and wherein the weight applied to each location in the first and second plurality of locations is adjusted based on the classification errors associated with the one or more selected relevant maps; a relevance weighting module for relevant weight calculation based on the classification errors associated with the one or more selected relevant maps; and a saliency model constructing module for saliency model construction based on the relevance weights and the one or more selected relevant maps.

A computer readable medium comprising computer executable software code stored in the computer readable medium can be executed to carry out the method provided in each of the first and second aspects of the disclosure.

The methods and systems herein described can be used in connection with any applications wherein generating of saliency models is desired. The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 2A shows an input image with lines indicating eye movement across the input image and circles indicating fixation locations in the input image. FIGS. 2B and 2C show a saliency map constructed using a linear combination with equal weights and optimal weights, respectively, for each of color, intensity, orientation, and face feature channels.

FIG. 3A shows the training stage while FIG. 3B shows the testing stage.

FIG. 4A shows an input image used to acquire human fixation data. FIG. 4B shows a fixation map obtained from the human fixation data using the input image of FIG. 4A. FIG. 4C shows conspicuity maps for each of color, intensity, orientation, and face feature channels.

DETAILED DESCRIPTION

Figure 1:
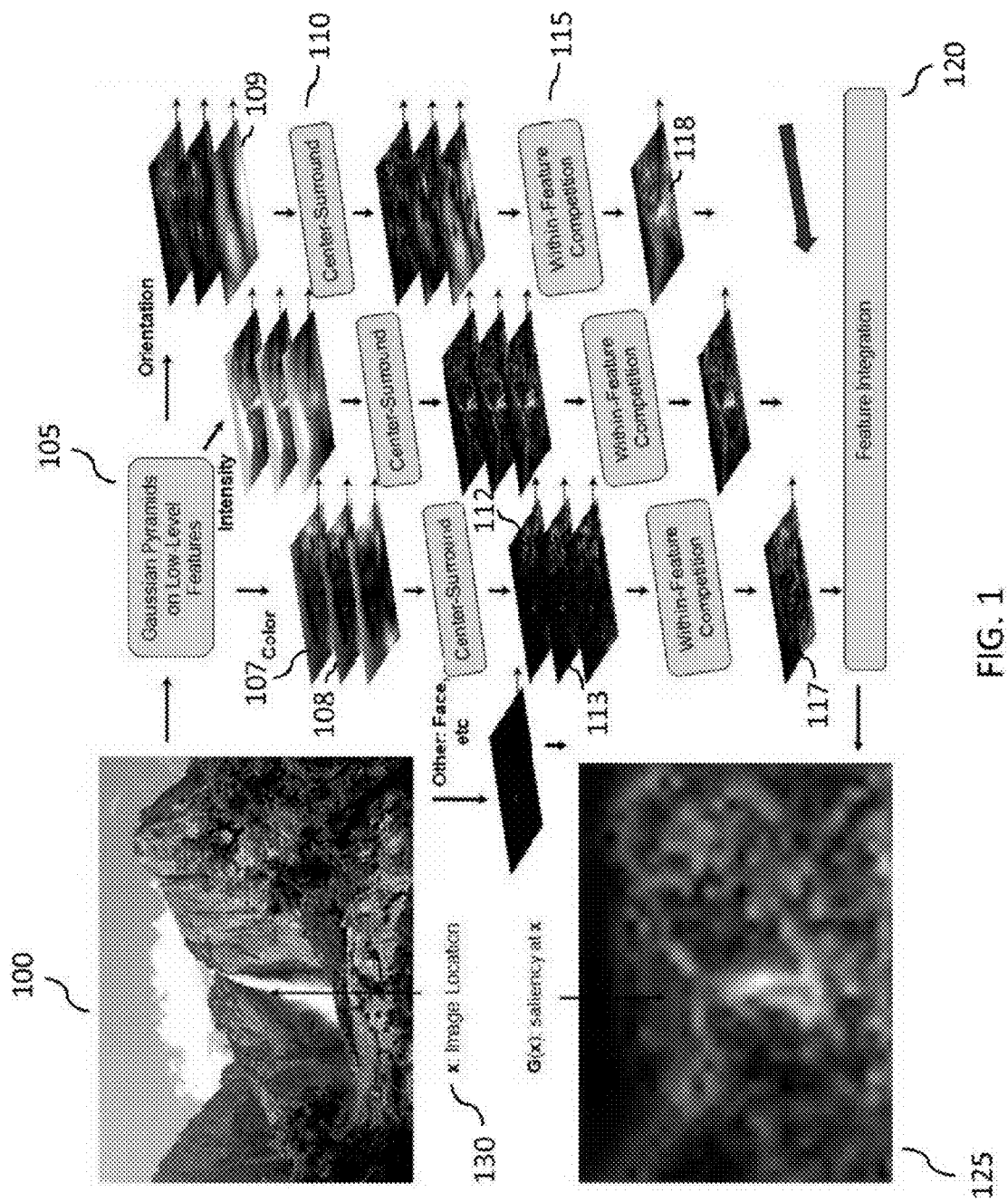
FIG. 1 shows a computational architecture of an Itti-Koch model, which is a computational saliency model that comprises color, intensity, and orientation feature channels, with an additional face feature channel.

Inspired by the primate visual system, computational saliency models decompose visual input into a set of feature maps across spatial scales. Some representative features of visual input utilized by saliency models include, but are not limited to, color, intensity, orientation, motion, flicker, and faces. Other features, by way of example and not of limitation, include texture, depth, contrast, size, aspect ratio, gist, text, and pedestrian. Additional features are definable and identifiable by a person skilled in the art.

As used in the present disclosure, the term "free-viewing" refers to looking at a visual scene (e.g., an image) without looking for anything in particular. The terms "fixation data" and "gaze data" can be used interchangeably, and, in the present disclosure, refer to data obtained from free-viewing of a visual scene. Although fixation data is obtained from human subjects in the present disclosure, they can also be obtained from other animals. The terms "non-activated" and "nonfixated" can be used interchangeably and the terms "activated" and "fixated" can be used interchangeably.

The term "salient" or "visually salient" refers to parts of a visual scene that elicits a strong, rapid, and automatic response from a subject, independent of tasks being performed by the subject. "Strength" or "weight" of a location refers to saliency of the particular location, where higher strength corresponds with higher saliency. A "saliency value" is a prediction of saliency, generated by a saliency model, at a particular location. At any time, a currently strongest location in the saliency map corresponds to the most salient object.

The term "feature channel" refers to a component of a saliency map model that takes into consideration a particular feature in a visual scene. For example, color found at a particular location in the visual scene will be detected and quantified using one or more color channels while brightness at a particular location in the visual scene will be detected and quantified using one or more intensity channels. Each feature can be detected using a feature detection module that comprises a plurality of feature channels. A "feature map" can refer to any one of a "raw feature map", "center-surround map", and "conspicuity map", each of which will be discussed later in the present disclosure.

The term "conspicuity map" refers to a final feature map of a particular feature channel. The term "saliency map" refers to a final feature map that integrates some or all feature maps of a visual scene. The saliency map displays saliency of all locations in the visual scene and is the result of competitive interactions among the conspicuity maps for features such as color, intensity, orientation, and faces that interact within and across each conspicuity map. A value in the saliency map represents local saliency of any one location with respect to its neighboring locations. Integration of all the conspicuity maps in the visual scene yields the saliency map of a particular visual scene. The obtained saliency map can be applied to predict locations where people will look at and not look at, also referred to as fixation locations and nonfixation locations, respectively, in other visual scenes.

The term "learning" refers to machine learning of a model through experimentally obtained information. Specifically, in the present disclosure, saliency models are learned through fixation data obtained from one or more subjects free-viewing one or more images.

Extent to which bottom-up, task-independent saliency maps predict locations at which the subjects fixate their visual attention under free-viewing conditions remains under active investigation (see reference [3], [10], and [11], incorporated herein by reference in their entireties). In some studies, bottom-up saliency has also been adopted (see references [30], [41], and [43], incorporated herein by reference in their entireties) to mimic top-down approaches. Since top-down approaches take into consideration goals and personal experiences of a subject viewing the visual scene, top-down approaches generally have larger inter-subject variability than bottom-up approaches. The present disclosure considers task-independent scrutiny of images when people are free-viewing a visual scene.

Suggestions were made concerning incorporation of higher-order statistics to fill gaps between predictive power of saliency map models and their theoretical optimum (see references [8] and [39], incorporated herein by reference in its entireties). Higher-order statistics refers to those statistics of higher order than first- and second-order statistics (e.g., mean and variance, respectively).

According to many embodiments of the present disclosure, another way to fill the gaps is through addition of more semantic feature channels into the saliency map model. Semantic feature channels, which relate to higher-level features of the visual scene, refer to those features in the visual scene with more meaningful content. Semantic feature channels could include objects (for example, faces, animals, text, electronic devices) and/or events (for example, people talking). Semantic features are in contrast to more abstract features of the visual scene such as color, intensity, and orientation, which are generally considered lower-level features. Incorporation of higher-level features generally improves accuracy in predicting where subjects will fixate their visual attention in a given visual scene (see references [9] and [31], incorporated herein by reference in their entireties).

Within each feature channel, various normalization methods have been proposed to integrate multi-scale feature maps into a final saliency map (see reference [7]) referred to as a conspicuity map. It should be noted that the term "integrate" refers to a combination or addition of feature maps, either through linear combination or nonlinear combination. The normalizations are performed across feature maps at different scales of the same feature as well as feature maps across different features. As one example, normalization can involve taking all values across all feature maps corresponding to a particular channel and dividing every value by a largest value. After normalization in this example, the largest value across all feature maps corresponding to a particular channel is 1. As another example, normalization can involve dividing all values across all feature maps corresponding to a particular channel by a value, where a sum of all the values across all feature maps corresponding to the particular channel is 1 after the division.

The focus of these normalization methods is to unify the multi-scale feature maps across different dynamic ranges and extraction mechanisms so that salient objects appearing strongly in a first set of multi-scale feature maps and not other multi-scale feature maps are less likely to be masked by these other multi-scale feature maps. For example, consider a first feature map that contains values between 0 and 1 and a second feature map that contains saliency values, also referred to as saliency scores, between 0 and 100. If the first feature map has salient regions (e.g., saliency values that are closer to 1 than they are to 0) and the second feature map has no salient regions (e.g., saliency values that are closer to 0 than they are to 100), then the salient regions of the first feature map will be more difficult to detect due to the salient regions being masked by the second feature map's determination of no salient regions. It should be noted that in some feature maps, higher values in a feature map correspond with lower saliency while lower values correspond with higher saliency. For example, for a feature map that provides values between 0 and 100, it cannot be assumed that a value close to 0 corresponds with lower saliency and a value close to 100 corresponds with higher saliency.

It should be noted that values of feature maps are generally provided by feature extraction/computation modules. As an example, for a color channel pertaining to green, the green component of an RGB representation can be utilized as the feature value (e.g., a value between 0 to 255 for a 24-bit RGB representation). As another example, feature values for a contrast spatial feature channel can be computed based on absolute values for mean gray levels of a particular region and neighboring regions that share a 4-connected border with the particular region. Feature values provided by the modules depend on implementation of the modules, and thus typically feature values provided by one module differ from feature values provided by another module. For instance, for an intensity channel associated with a feature extraction/computation module, values of a feature map can range from 0 to 25. For an intensity channel associated with another module, values of a feature map can range from 0 to 100.

Generally, linear integration of the feature channels is used to form a final saliency map (see references [6], [9], [12], and [14], incorporated herein by reference in their entireties). Linear integration of the feature channels is generally simple to apply and has some psychophysical support (see reference [15], incorporated herein by reference in its entirety), although linear integration does not have neurophysiological support. However, psychophysical arguments have been raised against linear integration methods (see references [28] and [40], incorporated herein by reference in their entireties). In addition, prior work (see references [26] and [33], incorporated herein by reference in their entireties) has been aware of the different weights, also referred to as strengths, contributed by different features to perceptual salience. In general, as more feature channels are used, more accurate saliency models can be learned. However, a tradeoff exists between computational cost and accuracy, both of which generally increase with more feature channels.

It should be noted that the final saliency map obtained through integration differs from a conspicuity map. The conspicuity map is a saliency map for a particular feature channel whereas the final saliency map obtained through integration is an integration of some or all of the conspicuity maps and possibly other feature maps (e.g., raw feature maps and center-surround maps). A discussion of generating the final saliency map for representing a learned saliency model can be found later in the present disclosure.

Some studies propose different criteria to quantify saliency, such as "surprise" (see reference [12]) and "self-information" (see reference [13], incorporated herein by reference in its entirety). Other studies propose a graph based method (see reference [14]) for generating activation maps within each feature channel.

Lacking sufficient neurophysiological evidence involving neural instantiation of feature integration mechanisms for saliency, studies have been performed using human eye tracking data to study feature integration methods. Human eye fixation data is obtained by presenting to the subjects many images (for example, hundreds or thousands of images) and asking the subjects to free-view the images. Based on the fixation data, a mapping module can map a location in each input image to a location in a fixation map. An eye tracker measures eye positions and movements during these viewing tasks. For any given subject, images at which the subject's eyes were fixated during the viewing are referred to as fixation locations while image locations at which the subject did not fixate are referred to as nonfixation locations. Generally, human eye fixation data is represented by a two-dimensional fixation map that provides information on where (and sometimes provides information on when) subjects fixate their eyes at particular locations in one or more images, referred to as recorded fixations.

An exemplary threshold used for classifying a location as either fixated or nonfixated is a time duration of fixation of 200 ms. In other words, a duration of fixation at a particular location of more than 200 ms would classify that particular location as a fixation location. An eye tracking database comprises the fixation data and the set of images utilized to generate said fixation data. Generally, the fixation data, for each image and each participating subject, is represented by a two-dimensional vector containing locations (in the image coordinate) of all fixations (and nonfixations) made within a certain period (e.g., 2-4 seconds).

In reference [42] (incorporated herein by reference in its entirety), weighing of different conspicuity maps, also sometimes referred to as importance maps, based upon eye movement studies. Images are segmented into regions, and weights of different features are estimated by counting fixations in these regions. Fixations are counted by calculating percentage of fixations that landed on regions classified by a particular feature as most important. "Most important regions" refer to those regions with the highest saliency values. For example, for all fixation data of M subjects, consider that 10% of fixations fall in regions classified as most important regions when color is used for classification and 5% of fixations fall in regions classified as most important regions when size is used for classification. In this case, a weight associated with color would be twice a weight associated with size.

Applicants provide learning based methods that use more principled learning techniques to derive feature integration and are closely related to two recent works that also learned saliency models from fixation data (see references [36] and [37], incorporated herein by reference in their entireties). In reference [37], a saliency model learned from raw image patches nonlinearly maps a patch to a real number indicating fixated or nonfixated locations. As used in reference [37], a patch refers to a square region of an image. This is in contrast to the term "region", which generally can be of any shape. Determining size and resolution of the patches is generally not straightforward and a tradeoff is made between computational tractability and generality. In addition, a high dimensional feature vector of an image patch requires a large number of training samples. Both references [36] and [37] apply support vector machines to learn saliency models.

It should be noted that "raw data" refers to image data to which no feature extraction step has been applied. In other words, raw data can refer to the image data free of any assumptions, since extraction of certain features from raw images introduces and implies assumptions made about which features would capture relevant information (e.g., information pertaining to salience of particular locations in an image). However, learning saliency models from raw data does not generally involve a feature extraction step and thus can be computationally costly due to high dimensional spaces generally associated with an image since even one pixel in the image has multiple feature dimensions. Consequently, many saliency models involve a feature extraction step first performed on a raw image to generate one or more maps, and the saliency model is learned based on these one or more maps (as opposed to directly based on the raw images). Feature extraction is essentially a dimension reduction process.

In reference [36], a large eye tracking database was constructed and a saliency model based on low-, mid-, and high-level image features was learned. Classification of features into one of low-, mid-, and high-level can be defined differently by different researchers. As previously mentioned, low-level features can refer to color, intensity, and orientation while high-level features can refer to objects (such as faces, pedestrians, and text) and events (such as people talking). An example of a mid-level feature, given in reference [36], can be a horizontal detector, which assumes most objects rest on the surface of the Earth, trained from a gist feature that captures context information and holistic characteristics in an image. The gist feature describes a vague contextual impression.

In many embodiments of the present disclosure, a data-driven approach using human fixation data has been used to study feature integration methods. A first model retains basic structure of a standard saliency model by using a linear integration method that considers bottom-up feature channels. This first model is compatible with literature on psychophysics and physiology, which provide support for a linear integration of different features in a visual scene, and is generally easier to implement than nonlinear integration methods.

In a second model, an AdaBoost (adaptive boosting) based model is used that combines an ensemble of sequentially learned models to model complex input data. In this second model, the ensemble approach allows each weak classifier, also referred to as a base model, to cover a different aspect of the data set (see reference [35], incorporated herein by reference in its entirety). In addition, unlike reference [37], which uses raw image data, and reference [36], which includes a set of ad-hoc features, the features of the present disclosure are bottom-up biologically plausible ones (see references [1] and [6]).

"Ad-hoc" features generally refer to any features implemented into a model based on empirical experience of a researcher concerning a particular application associated with the model. With respect to saliency models, ad-hoc features implemented into the saliency models are based on empirical experience of a researcher and generally does not take into consideration biological processes related to vision of humans and other animals.

"Biologically plausible" features refer to those designed according to biological systems, essentially mimicking visual processes (as well as physical and mental processes related to visual processes) of humans and other animals. Saliency models built around biologically plausible features work under an assumption that since humans and many other animals generally have higher capacity for saliency detection than machines, mimicking biological processes of humans and other animals can lead to accurate, broadly applicable saliency models.

FIG. 1 shows a computational architecture of an Itti-Koch model (see reference [6]), which is a computational saliency model that comprises three low-level features (color, intensity, and orientation), with an additional face feature channel. Specifically, the original Itti-Koch model (without the additional face feature channel) includes two color channels (blue/yellow and red/green), one intensity channel, and four orientation channels (0°, 45°, 90°, 135°).

Raw feature maps, also referred to as raw maps, of different spatial scales are created for each feature channel using successive low-pass filtering followed by downsampling (105). In FIG. 1, each dyadic Gaussian pyramid (105) performs the successive low-pass filtering and downsampling of an input image (100). Raw feature maps (for example, 107, 108) of nine spatial scales (0-8) are created for each feature by applying dyadic Gaussian pyramids (105) to raw data. A spatial scale of 0 yields an output image of the same resolution (i.e., $\frac{1}{2}^0$ times the resolution of the input image) as that of the input image (100). A spatial scale of 3 yields an output image of resolution $\frac{1}{2}^3$ times the resolution of the input image (100). Consequently, a lower spatial scale is finer than a higher spatial scale. A scale 1 map can be obtained by applying a dyadic Gaussian pyramid (105) to a scale 0 map, a scale 2 map can be obtained by applying a dyadic Gaussian pyramid (105) to a scale 1 map, and so forth. Although number of spatial scales used can be arbitrarily big, nine spatial scales are generally sufficient to capture information at different resolutions for many input images.

Center-surround difference maps are then constructed (110) as point-wise differences across spatial scales, or equivalently point-wise differences between fine and coarse scales of the input image (100) as obtained from applying the dyadic Gaussian pyramids (105) to the input image (100), to capture local contrasts. Specifically, six center-surround difference maps (for example, 112, 113) are then constructed (110) as point-wise differences across spatial scales using a center level c=$\{2, 3, 4\}$ and surround level s=c+δ, where δ=$\{2,3\}$ for each feature channel.

Consequently, with two color channels, one intensity channel, and four orientation channels, there are 42 center-surround difference maps. Each set of six center-surround difference maps is given by 2-4, 2-5, 3-5, 3-6, 4-6, and 4-7, where, for example, 2-4 denotes the point-wise difference across spatial scales 2 and 4. It should be noted that the values for the center level and the surround level, which lead to the number of center-surround difference maps, are based on an original implementation of the Itti-Koch model. Other values for the center and surround level can be used.

A single conspicuity map (for example, 117, 118) is obtained for each of the feature channels through utilization of within-feature competition (115) of one or more sets of six center-surround difference maps, and is represented at spatial scale 4. A spatial scale of 4 is used since it is between the available spatial scales of 0 and 8. Specifically, in the implementation shown in FIG. 1, the within-feature competition (115) is performed using across-scale addition.

Across-scale addition refers to addition of the six center-surround difference maps as provided by sum[(2-4), (2-5), (3-5), (3-6), (4-6), (4-7)] to obtain an intermediate map. Weight applied to each of the six center-surround difference maps is generally, but not necessarily, equal. As previously mentioned, each conspicuity map corresponds with a particular feature channel utilized in the Itti-Koch model. To obtain a conspicuity map corresponding with a feature channel, the intermediate maps obtained through across-scale addition are summed together. For instance, since the original Itti-Koch model includes one intensity channel, the intermediate map, obtained from adding one set of six center-surround difference maps, is the conspicuity map for the intensity feature channel. On the other hand, since the original Itti-Koch model includes four orientation channels, the four intermediate maps, each intermediate map obtained from adding one set of six center-surround difference maps associated with one orientation channel, are added together to form the conspicuity map for the orientation feature channel. Weight applied to each intermediate map is also generally, but not necessarily, equal.

Each of the feature maps presented above (e.g., raw feature maps, center-surround maps, and conspicuity maps) can be generated using one or more map generating modules. Each map generating module can be implemented to generate one type of feature map or multiple types of feature maps using the processes provided above.

Samples are used to learn optimal weights for the feature channels. In a first embodiment of the present disclosure, each image location x (130) in an image serves as a sample that is utilized in learning optimal weights for the feature channels. Each sample comprises a feature vector of a particular location x (130) and a value of that particular location x (130) in a fixation map (taken to be ground truth). Relevant maps, which refer to maps utilized in evaluating salience, include all conspicuity maps. It should be noted that a plurality of input images (100) and/or a plurality of subjects can be used to obtain samples. Specifically, an image location x (130) refers to a location within any input image in the plurality of input images (100).

In a second embodiment of the present disclosure, a sample generation process involves, for each image location x (130) in the input image (100), extracting values (shown as rightward pointing arrows in FIG. 1) of relevant maps at the particular image location (130) and stacking the values to obtain the sample vector f(x). Relevant maps can take into account one or more of feature maps across different spatial scales (for example, 107, 108), center-surround difference maps (for example, 112, 113), and/or conspicuity maps (for example, 117, 118). A final saliency map (125) is obtained by applying the optimal weights to some or all of the relevant maps and performing integration (120) of the weighted relevant maps. For the Itti-Koch saliency model, linear integration is utilized. The optimal weights obtained can generally be used to define a saliency model used for prediction of fixation and nonfixation locations of different visual scenes. Similar to the first embodiment, it should be noted that a plurality of input images (100) and/or a plurality of subjects can be used to obtain the sample vector f(x). Specifically, an image location x (130) refers to a location within any input image in the plurality of input images (100).

According to many embodiments of the present disclosure, a saliency model is built upon the Itti-Koch saliency model, where an additional face channel (a high-level feature) is added to the Itti-Koch saliency model (see references [6] and [9]), as shown in FIG. 1. The face channel is an independent feature channel of a computational saliency model that performs face detection over an input visual scene. The conspicuity map of the face channel can be generated by a face detector, such as the face detector provided in reference [46], incorporated herein by reference in its entirety. The saliency model uses an optimized set of weights learned from human fixation data for weighting some or all of the relevant maps, possibly including weighting of the conspicuity map of the face channel, of a particular saliency model prior to integration (120). It should be noted that values in a conspicuity map are normalized to fall within [0,1] and weights applied to conspicuity maps are normalized to sum to 1. Consequently, saliency values in the final saliency map is also in the range of [0,1].

With continued reference to FIG. 1, according to an embodiment of the present disclosure, learning of a saliency model is directly from output of the spatially organized feature maps from the input images and fixation maps constructed from the training data. "Spatially organized" refers to each conspicuity map having a spatial layout and locations corresponding to those in the input image (100). The learning of the saliency model does not involve assumptions or explicit modeling of data patterns such as modeling inherent structures or analyzing characteristics in the input image (100). In addition, unlike methods that do not include any subject-specific information, the learning of the saliency model of the embodiments of the present disclosure can be applied to training one saliency model for each subject, thereby providing a principled framework to assess inter-subject variability by taking into account each subject's bias toward certain visual features.

In the first embodiment of the present disclosure, a final saliency map is generated through linear integration of each conspicuity map, where each conspicuity map is a relevant map. Specifically, the conspicuity maps are used to construct feature vectors from fixation data to learn optimal weights used in performing linear integration. By using conspicuity maps for each feature, the linear integration involves mainly relevant information for a particular feature channel and estimated feature weights of the particular feature channel are not affected by other feature channels.

To quantify relevance of different features in deciding where a human eye would fixate, linear, least square regression with constraints calculated from the human fixation data can be used to learn the feature weights of the different features. Weights applied to the conspicuity maps (or similarly weights applied to the feature channels) can be normalized so as to sum to 1. Additionally, values in a conspicuity map are normalized to fall within [0,1]. Consequently, since the weights are normalized to sum to 1 and the conspicuity map normalized to fall within [0,1], the final saliency map is also in the range of [0,1]. A higher weight for a feature channel signifies that the particular feature channel is more relevant in predicting fixation locations and nonfixation locations.

For example, if $w_F > w_C$, the feature channels for face are more important in predicting where people are likely to look at (fixation locations and nonfixation locations). Consider that there are two regions (A and B) in an image, where A is salient in color (e.g., possesses traits that lead to high saliency values obtained by the color channel) and B is salient in face information, where saliency values in their respective conspicuity maps (i.e., A in the color conspicuity map and B in the face conspicuity map) are the same. Since the weight of the face channel is larger, the saliency model predicts that people will look at the region with faces before looking at the region that is salient in color. As a sidenote, a region that is salient in color can possess, for instance, bright colors. Since intensity can be, and usually is, calculated as an average of R (red), G (green), and B (blue) values, regions salient in color may also be salient in intensity.

As an example of the first embodiment (and as illustrated in FIG. 1 and FIG. 4), color, intensity, orientation, and face conspicuity maps are used to construct feature vectors for learning of the saliency model. Let V=[C I O F] denote a matrix comprising stacked feature vectors constructed from the color C, intensity I, orientation O, and face F conspicuity maps; $M_{fix}$ denote a vectorized fixation map of the same spatial resolution as the conspicuity maps; and $w=[w_C\ w_I\ w_O\ w_F]^T$ denote weights of the four feature channels.

The vectorized fixation map $M_{fix}$ is a one-dimensional map constructed from concatenating each row (or column) of an initial two-dimensional fixation map (generated using fixation data) to form a vector. The initial two-dimensional fixation map is represented as recorded fixations, sampled to be of equal resolution for each of the conspicuity maps (e.g., generally spatial scale 4 for the Itti-Koch model), convolved with an isotropic Gaussian kernel, where an assumption is made that each fixation gives rise to a Gaussian distributed activity. By convolving with an isotropic Gaussian kernel, correspondence between exact fixation location in the image and corresponding image features are smoothed.

It should be noted that a fixation location is an exact location in the image. Since it is a location at which subjects fixate, saliency values at fixation locations are usually high and saliency values at locations around the exact location (unless these locations are also fixation locations) are usually lower than those at the exact location. By smoothing the correspondence between exact fixation location and corresponding image features, locations around the exact fixation location can also exhibit high saliency values, which is in accordance with functionality of the eyes of humans and other animals. Additionally, by smoothing the correspondence, effects of noises or deviations can be counteracted since locations around the exact location will have higher saliency scores (relative to the case of no smoothing) and will be less affected by noise and deviations. These deviations refer a difference between an expected fixation location and an actual fixation location. For instance, consider that a particular region at location (x,y) has a maximum saliency value, but a subject looked at a nearby position (x+m,y+n). The m and n are small amounts referred to as deviations.

An objective function (which refers to a function for which a maximum or minimum is sought subject to given constraints) for minimization of feature weights is provided by:

$$\operatorname*{argmin}_{w} |V \times w - M_{fix}|^2 \quad \text{subject to } w \geq 0,$$

where V×w is a saliency value, which is a weighted average of the conspicuity maps represented by V and the weights represented by w, and $M_{fix}$ is the vectorized fixation map obtained from human fixation data. The objective function defines a formal equation for finding a set of weights w that minimizes $|V \times w - M_{fix}|^2$.

It should be noted that if one or more input images have X×Y locations total and a spatial scale 4 is utilized, the resulting conspicuity maps would have $(X/2^4) \times (Y/2^4)$ locations while the two-dimensional fixation map would be sampled to a resolution with $(X/2^4) \times (Y/2^4)$ locations. The matrix V holds stacked feature vectors from each of the four conspicuity maps (color, intensity, orientation, and face) and thus is a $[(X/2^4)(Y/2^4)] \times 4$ matrix, the vector w is a 4×1 vector, and V×w and $M_{fix}$ are $[(X/2^4)(Y/2^4)] \times 1$ vectors. Consequently, $V \times w - M_{fix}$ is a vector, where each element is a difference between a saliency value at a particular location in the conspicuity map and a value derived at the particular location from the human fixation map. The saliency value is considered a predicted value whereas the value derived from the fixation map is called "human performance" or "ground truth".

In the objective function, the constraint (w≥0 in this case) defines a feasible region. Specifically, weights applied to each of the conspicuity maps (or equivalently weights applied to each feature channel) are non-negative. The objective function can be solved using an active set method (see reference [32], incorporated herein by reference in its entirety). The active set method finds a feasible starting point within the feasible region and then iteratively updates until finding a desired solution. The objective function can also be solved by a greedy search method along the feasible regions, where every possible value in the feasible region is evaluated. Other methods of solving the objective function can be performed with techniques and procedures identifiable by a skilled person.

Figure 2A:
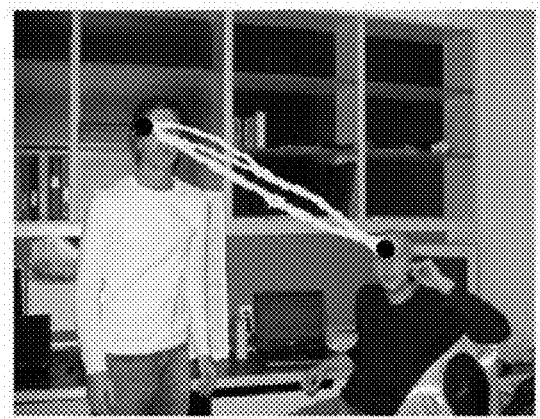
FIGS. 2A-2C provide illustrations of how feature weights affect final saliency maps.
Figures 2B, 2C:
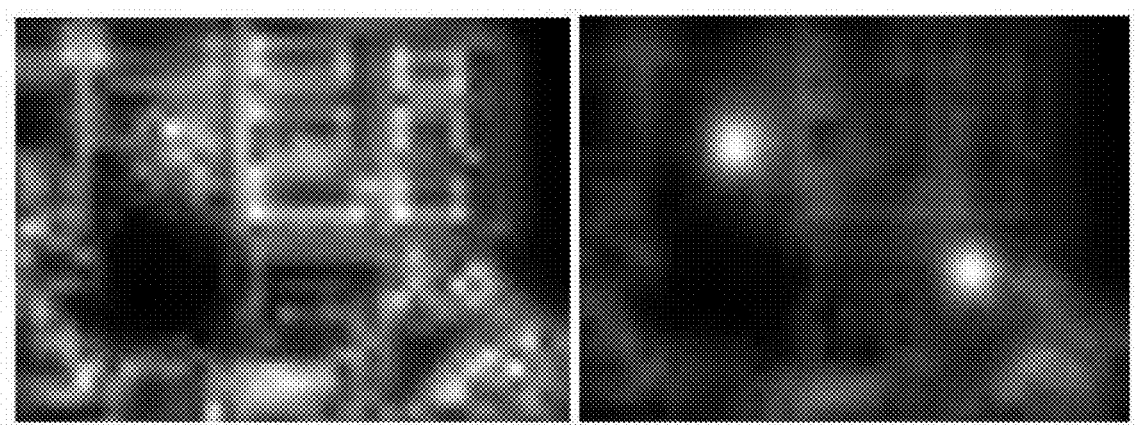

FIGS. 2A-2C provide illustrations of how feature weights affect final saliency maps. FIG. 2A shows an input image with lines indicating saccadic eye movement across the input image and black circles indicating fixation locations in the input image. FIGS. 2B and 2C show a saliency map constructed using a linear combination with equal weights and optimal weights, respectively, for each of the feature channels. It should be noted that in the saliency map of FIG. 2C, higher weights were obtained for the face channel, and thus the fixation locations relating to faces in the input image of FIG. 2A are clearly shown as bright areas (i.e., areas with a high saliency score) in FIG. 2C.

In the second embodiment of the present disclosure, to remove the assumption of linear integration of the feature channels, an AdaBoost based method is used for learning saliency models. The AdaBoost method is a special case of boosting, where boosting refers to a machine learning technique for supervised learning. Supervised learning refers to inferring a function, also referred to as a classifier or a model, from training data. The AdaBoost method can be utilized for constructing a saliency model involving nonlinear integration of conspicuity maps (see references [17], [18], [19], and [20], incorporated herein by reference in their entireties). In applying the AdaBoost method, number of boosting rounds can be tuned.

With reference back to FIG. 1, in the second embodiment of the present disclosure, the relevant maps include intermediate maps (raw maps (for example, 107, 108) and center-surround difference maps (for example, 112, 113)) as well as the conspicuity maps (for example, 117). Each of the relevant maps is used to form the sample vector f(x) at each location x.

A final saliency map (125) is obtained by a product between a set of learned weights and a set of learned weak classifiers. Integration (120) involves feature selection, thresholding, weight assignment, and feature combination, each of which will be discussed later in the disclosure. In the second embodiment, the sample vector is given by $$f(x)=[f_1(x) f_2(x) \ldots f_{nf}(x) f_{nf+1}(x) \ldots f_{nf+ncs+1}(x) \ldots f_{nf+ncs+nc}(x)],$$

where subscript "nf" denotes number of raw feature maps, "ncs" denotes number of center-surround maps, and "nc" denotes number of conspicuity maps. Each element $f_n(x)$ in the sample vector is a scalar quantity, where subscript n denotes a number assigned to a map.

Although the numbering can be arbitrary, an example of construction of the sample vector is given as follows. In FIG. 1, $f_1(x)$ corresponds with a value in a first raw feature map (107), $f_2(x)$ corresponds with a value in a second raw feature map (108), $f_{nf}(x)$ corresponds with a value in a last raw feature map (109), $f_{nf+1}(x)$ corresponds with a value in a first center-surround map (112), $f_{nf+ncs+1}(x)$ corresponds with a value in a first conspicuity map (117), and $f_{nf+ncs+nc}(x)$ corresponds with a value in a last conspicuity map (118). As a particular example, with further reference to the Itti-Koch model, where three types of feature channels (color, intensity, and orientation) are utilized, the stacked vector f(x) at each location x contains information from 87 maps (nf=42 raw feature maps, ncs=42 center-surround maps, and nc=3 conspicuity maps). In the Itti-Koch model with an additional face feature channel, each location x contains information from 88 maps (42 raw feature maps, 42 center-surround maps, and 4 conspicuity maps).

The functions to be inferred are weak classifiers $g_t$ and their weights $\alpha_t$. A weighted combination of iteratively learned weak classifiers (also referred to as base classifiers or base models), denoted as $g_t(f)$, are used to infer a strong classifier, denoted as G(f). For subject-specific saliency models, only fixation data from one subject is used to infer the weak classifiers and weights associated with the weak classifiers. These weak classifiers and weights are then used to define the strong classifier. For general saliency models (constructed to be applicable to a general population), fixation data from all subjects are used to infer the weak and strong classifiers as well as the weights.

A weak classifier refers to a classifier that is slightly better than a random guess and is usually of simple form, such as a linear classifier. A "guess" refers to an initial classification of each of the samples. A "random guess" arbitrarily assigns each of the samples to one of the two classes (i.e., 50% nonfixation and 50% fixation).

A strong classifier obtained through learning of the weak classifiers and the weights corresponding to each of the weak classifiers generally performs better in predicting whether a particular sample corresponds to a nonfixation location or a fixation location. For learning saliency models, the AdaBoost method generally involves two classes: a class for nonfixation locations (generally denoted as −1) and a class for fixation locations (generally denoted as a 1).

Through each iteration of the AdaBoost method, weak classifiers are adjusted in favor of the misclassified samples, which refer to sample locations in the image being incorrectly classified as a fixation or a nonfixation location (using fixation data as ground truth). Specifically, after each weak classifier is trained, all data samples are reweighted such that samples misclassified by previously trained weak classifiers are weighted more. Subsequently trained weak classifiers will place more emphasis on these previously misclassified samples.

A method for learning a nonlinear feature integration using AdaBoost is provided as follows. The method comprises a training stage and a testing stage. In the training stage, the method takes as input a training dataset with N images and human eye tracking data from M subjects. In the testing stage, the method takes as input a testing image Im.

In the second embodiment, the Adaboost method is used to learn a nonlinear integration of relevant maps by generating a one-dimensional real number from a feature vector in the d-dimensional space G(f): $R^d \rightarrow R$, where d is the dimension of the feature vector f(x) (or equivalently the number of relevant maps being added together). Formally, $$G(f) = \sum_{t=1}^{t=T} [\alpha_t \cdot g_t(f)]$$

where $g_t(\cdot)$ denotes a weak classifier where $g_t(f) \in \{-1,1\}$, $G(\cdot)$ is a final saliency model where $G(f) \in [0,+\infty)$, $\alpha_t$ is a weight applied to $g_t(\cdot)$, and T is a total number of weak classifiers considered in the learning process. The total number of weak classifiers, denoted as T, is pre-defined depending on number of features (e.g., relevant maps) desired to be selected from the feature pool.

It should be noted that each image location x corresponds to a feature vector f(x). As previously mentioned, the weak classifier $g_t(f)$ can be −1 or 1, where −1 predicts that location x is a nonfixation location while 1 predicts that the location x is a fixation location. As an example, in the Itti-Koch model with an additional face feature channel, the sample vector f(x) is an 88×1 vector. The weak classifier $g_t(f)$ takes the sample vector and maps it to a value of −1 or 1. Information from each of the channels (including but not limited to color, intensity, orientation, and face) contained in the feature vector are used to obtain $g_t$ and $\alpha_t$ for each of the samples from one or more images.

Instead of taking polarity of the AdaBoost output, as conventionally used to solve classification problems, the present embodiment utilizes real values of the strong classifier G(f) to form a saliency map. When predicting where people will look at and not look at, a particular location can be classified as a fixation location and a nonfixation location. In a binary situation, a location can be a fixation location (e.g., '1') or a nonfixation location (e.g., '−1'). By using real numbers, additional information of each fixation location and each nonfixation location can be provided. For example, consider that a prediction of first ten fixation locations is desired. With a saliency map of real numbers instead of just 1 and −1 (or any other set of binary values), prediction of which locations will be fixated and in what order each of these predicted fixated locations will be fixated can be achieved.

In the training stage, from eye tracking data of M subjects viewing N images, the following is performed:

Step 1. From all locations in N images, a subset of S locations, referred to as samples and denoted as $x_s$, is selected, where s={1, 2, ..., S}. Each sample has a corresponding label $y_s$, where $y_s$=1 for a positive sample (i.e., a sample from a fixation location) and $y_s$=−1 for a negative sample (i.e., a sample from a nonfixation location). The labels are provided by the human fixation data. The human fixation data provides the ground truth, which is considered the correct classification of a sample as a fixation or nonfixation location, and is used to train the weak classifiers.

Both positive and negative samples are selected from the human fixation map. For positive samples, locations sampled depend on values of the fixation maps. For example, if the value of a location A is twice that of location B in the fixation map, probability of A being sampled is twice the probability of B being sampled. All locations of 0 value have zero probability of being sampled as a positive sample. For negative samples, uniform sampling of all locations with a 0 value in the human fixation map is performed. Number of positive samples and negative samples is specified by a person building the saliency model. The number of positive samples and negative samples is generally chosen to be the same and is generally in the thousands over a set of input images (and in the tens for each input image). From the sampling, a feature vector at a location $x_s$ is computed and denoted as $f(x_s)$ (or simply $f_s$). A sampling module can be utilized to select these positive and negative samples.

Step 2. Initialize weights of each sample to be $$w_s = \frac{1}{S}.$$

The weights applied to each sample will be adjusted during Step 3 of the training stage.

Step 3. For t=1, ... T, where T denotes number of weak classifiers to be trained (generally pre-defined), each of Step 3.a), 3.b), and 3.c) are performed. In each iteration, one weak classifier $g_t$ and its corresponding weight $\alpha_t$ are learned.

Step 3.a) Train a weak classifier $g_t$: $R^d \rightarrow \{-1,1\}$, which minimizes the weighted error function $$g_t = \underset{g_u \in G}{\operatorname{argmin}} \varepsilon_u = \underset{g_u \in G}{\operatorname{argmin}} \sum_{s=1}^{s=S} w_t(s)[y_s \neq g_u(f_s)]$$

where $\epsilon_u$ refers to classification error sought to be minimized, G refers to the set of all feature dimensions, and $[y_s \neq g_u(f_s)]$ is an indicator function that is equal to 0 if $y_s = g_u(f_s)$ and equal to 1 if $y_s \neq g_u(f_s)$. Specifically, for a sample s, if its label $y_s$ is different from an output of the weak classifier $g_u(f_s)$ corresponding to sample s, then $[y_s \neq g_u(f_s)]$ is 1 and the classification error $g_t$ increases by $w_t(s)$.

For every feature dimension ($g_u \in G$), a classification error is computed at all possible pre-defined thresholds. A "best" relevant map, also referred to more simply as a "best" feature, is a relevant map associated with the minimum classification error in a given iteration of Step 3.

When evaluating each relevant map, error for the relevant map is obtained across all possible pre-defined thresholds. A threshold refers to a value that serves as a cutoff from which a sample is predicted to be nonfixated of fixated. Specifically, values in a sample can be normalized to values between 0 and 1. The threshold candidates are a plurality of values (e.g., any value between 0 to 1 in increments of 0.1 or 0.01). For each threshold value, two directions are searched. As an example, consider a threshold m. With a threshold of m and for a particular feature dimension, if a sample with a value x satisfies x>m, then the weak classifier outputs $g_t=1$. Otherwise, the weak classifier outputs $g_t=-1$. In the other direction for the same threshold value and feature dimension, if a sample with a value x satisfies x<m, then the weak classifier outputs $g_t=1$. Otherwise, the weak classifier outputs $g_t=-1$. Consequently, the AdaBoost based method makes no assumption as to whether higher values refer to higher salience or lower salience. For instance, a feature map can have values at its locations between 0 and 1, where values closer to 1 are less salient and thus more likely to be nonfixation locations while values closer to 0 are more salient and thus more likely to be fixation locations.

For each relevant map, all possible thresholds are tested, and $\epsilon_u$ is the minimum error across all the possible thresholds (and directions) associated with the relevant map. Generally, the threshold that minimizes the classification error can be different between different relevant maps. A map selecting module can be used to consider classification error for each relevant map at all possible thresholds (and directions) and selects the relevant map and the threshold (and direction) associated with minimum classification error.

Step 3.b) Set the weight of $g_t$ as $$\alpha_t = \frac{1}{2} \ln\left[\frac{1-\varepsilon_t}{\varepsilon_t}\right],$$

where $\epsilon_t$ is the minimum classification error obtained in Step 3.a). As shown by the equation, a smaller classification error $\epsilon_t$ yields a higher relevance weight $\alpha_t$ (or simply referred to as weight). A relevance weighting module can be used to perform the calculation involved in generating the relevance weight.

Step 3.c) Update sample weights $$w_{t+1}(s) = \frac{w_t(s)\exp[-\alpha_t y_s g_t(f_s)]}{Z_t},$$

where $Z_t$ is a normalization factor chosen such that a sum of $w_{t+1}(s)$ over all samples s=1, S is 1. In the above equation, a correct classification (i.e., $y_s=g_t$) leads to $w_{t+1}(s)<w_t(s)$ since $-\alpha_t y_s g_t(f_s)<0$ and thus $\exp[-\alpha_t y_s g_t(f_s)]<1$. A misclassification (i.e., $y_s \neq g_t$) leads to $w_{t+1}(s)>w_t(s)$ since $-\alpha_t y_s g_t(f_s)>0$ and thus $\exp[-\alpha_t y_s g_t(f_s)]>1$. Consequently, data samples are reweighted such that samples misclassified by previously trained weak classifiers are weighted more in future iterations. Thus, subsequently trained weak classifiers will place emphasis on these previously misclassified samples. Setting and adjustments of these sample weights can be performed using a sample weighting module.

Step 4. A strong classifier, also referred to as the final saliency model, is defined as $$G(f) = \sum_{t=1}^{t=T} [\alpha_t \cdot g_t(f)],$$

a linear combination of weights and weak classifiers obtained in Step 3. A saliency model constructing module can be used to implement this linear combination. It should be noted that the weak classifiers outputs a value $g_t$ ('1' for fixation location and '−1' for nonfixation location) for each location in the relevant map. A "thresholded relevant map" can be generated from these weak classifiers. Specifically, each location of the thresholded relevant map, which corresponds with one location in the relevant map, is set to either '1' or '−1', depending on whether the location is predicted to be a fixation or nonfixation location. Consequently, the output of the strong classifier at a particular location is a sum of a product between each relevance weight associated with the selected relevant maps and value of the thresholded relevant maps corresponding to the selected relevant maps at the particular location.

Once the saliency model G(f) is learned, the saliency model can be applied to any images to provide a saliency map of those images. Specifically, in the testing phase, for each location x in an image Im, the feature vector f(x) is computed and then the strong classifier G(f): $R^d \rightarrow R$ is used to obtain a saliency score of f(x). The saliency values form the saliency map of the image Im. Evaluation of the saliency model can be performed by obtaining fixation data on the new image and comparing the fixation data with saliency values provided in the saliency map of the new image.

Figure 3A:
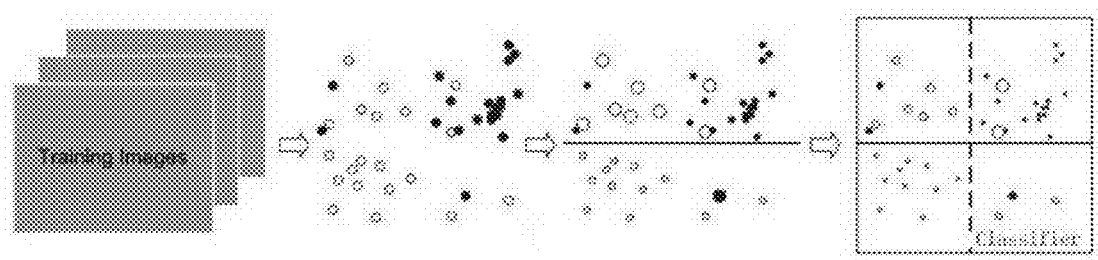
FIGS. 3A and 3B show an illustration of an AdaBoost based saliency model, which comprises a training stage and a testing stage. Specifically.
Figure 3B:
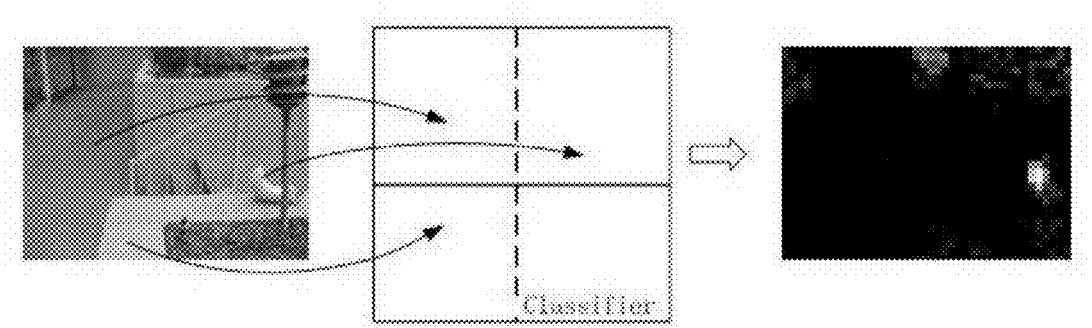

FIGS. 3A and 3B show an illustration of the AdaBoost based saliency model. Specifically, FIG. 3A shows the training stage and FIG. 3B shows the testing stage. White and black circles in FIG. 3A represent two different classes of samples; one arbitrary classification would be that the white circles represent positive samples and the black circles represent negative samples. In the training stage (shown in FIG. 3A), from a set of training images, positive samples and negative samples are collected. A positive sample is an image feature vector at fixated locations, which is labeled '1', while a negative sample is an image feature vector at nonfixated locations, which is labeled '−1'. Based on these samples, a weak classifier is trained through iterations. In the testing stage (shown in FIG. 3B), for any new image, a feature vector of each location in the image is calculated and input to the trained classifier, also known as a strong classifier, to obtain a saliency value for each location. Bright locations in FIG. 3B refer to those areas of high saliency, and thus higher probabilities of being fixated upon by subjects viewing the image.

The AdaBoost based method automatically addresses feature selection, thresholding, weight assignment, and nonlinear integration in a principled framework. Each of these aspects of the AdaBoost based method will be described in more detail.

As shown in step 3.a) above, the AdaBoost method goes through all feature dimensions (G) and selects one weak classifier $g_t$, corresponding to a particular relevant map (also referred to as a feature), that best (smallest $\epsilon_t$) separates positive and negative samples. This provides a selection of one feature. While testing each of the features, all thresholds are tested and the threshold with the smallest $\epsilon_t$ is used for the classifier $g_t$. After the selection of the best feature, weights associated with the selected feature are computed in 3.b) above.

Each iteration of steps 3.a) selects one feature for the set of S samples. It should be noted that each sample has a weight initially set to 1/S. After each iteration, a feature is selected, a weak classifier is built, and the weights of each of the samples are recalculated and normalized. Therefore, although the set of samples (including the feature vectors and labels associated with the samples) remains unchanged from one iteration to another, the weights of the samples change and thus a current set of data on which a weak classifier is learned does change.

For learning nonlinear integration using the AdaBoost based method, the feature pool comprises all intermediate maps (raw maps and center-surround maps) as well as the conspicuity maps, and AdaBoost automatically selects the best features from the feature pool. With reference to the saliency model with four feature channels, the feature pool includes 42 raw maps, 42 center-surround maps, and 4 conspicuity maps, for a total of 88 channels. As shown in FIG. 2, for an image location x, values of the relevant maps at this particular location are extracted and stacked to form the sample vector f(x) used for learning.

The AdaBoost based method possesses certain traits. First, the AdaBoost method selects from a feature pool informative features that nevertheless have significant variety. Variety is obtained through selection of different relevant maps as the best relevant map through the different iterations. For example, consider that $T_1$ relevant maps have been selected and are used to build $T_1$ weak classifiers. Samples that are misclassified by these $T_1$ weak classifiers are weighted more in subsequent iterations and thus subsequently trained weak classifiers generally classify these previously misclassified samples better than the previously derived $T_1$ weak classifiers. Consequently, it is more likely that some previously unselected relevant maps that are very different from those relevant maps already selected will be selected in subsequent iterations since the $T_1$ weak classifiers have not accurately classified the misclassified samples.

The framework can easily incorporate interesting features proposed by researchers in the community and selects the best features in a greedy manner. Interesting features generally refer to image features that describe image content well. For example, interesting features include those image features that are discriminative and reliable under different real-world challenges such as partial occlusion, illumination changes, blurring, and so forth, while efficient (generally, fast) to compute. Different applications generally place different emphasis on image features, and thus features considered "interesting features" are dependent on particular applications. A "greedy manner" refers generally to those computational methods where, in each iteration, all candidates are evaluated to determine a best candidate. With reference to saliency models, a greedy manner involves evaluating all features within an entire feature pool and selecting a best feature from the entire feature pool.

Second, the AdaBoost method finds the optimal threshold for each feature, which is consistent with the neuron firing properties (see references [28] and [40]), and makes no assumptions concerning weights of the features. Assumptions concerning weights of the features can affect accuracy of a saliency model constructed using these weights. For instance, no assumption is made that the weights of the features are equal.

Third, the AdaBoost based method is not confined to linear integration of the feature channels. Through nonlinear combinations of individual maps via a series of classifiers, the AdaBoost based method can outperform linear integration models for saliency. It should be noted that, since biological neurons are highly nonlinear devices, use of the AdaBoost based method raises questions concerning extent to which the primate brain takes advantages of such nonlinear integration strategies (see reference [27], incorporated herein by reference in its entirety).

FIG. 4A shows an example of an image used in human eye fixation experiments. With the recorded fixation data, psychophysical fixation maps can be constructed to represent successive fixations of subjects viewing the images. FIG. 4B shows a fixation map generated using human fixation data obtained using the image of FIG. 4A. For each subject i viewing image j, the human fixation map can be formulated as:

$$HF_j^i(x) = \begin{cases} 1, & \text{fixation at } x \\ 0, & \text{otherwise} \end{cases}$$

where x denotes the two-dimensional image coordinates. Assuming that each fixation gives rise to a Gaussian distributed activity, all fixation data is represented as a human fixation map $HF_j^i$ convolved with an isotropic Gaussian kernel $K_G$ as $$F_j^i = K_G * HF_j^i.$$

where $$K_G(x) = ae^{\frac{(x-b)^2}{2c^2}}.$$

Although the Gaussian kernel is utilized, other kernels such as a Lorentzian kernel can also be used as a smoothing function.

As shown in FIG. 4C, for an image location x, the values of the color, intensity, orientation, and face conspicuity maps at this particular location are extracted and stacked to form the sample vector $f(x) = [C(x) \ I(x) \ O(x) \ F(x)]^T$.

Many criteria can be used to evaluate the performance of a computational saliency model. Receiver operating characteristics (ROC) (see references [14] and [21], incorporated herein by reference in their entireties) is a metric commonly used. However, ROC depends on ordering of the values and does not capture amplitude differences. In practice, as long as hit rates are high, an area-under-the-curve (AUC) is always high regardless of a false alarm rate. A hit refers to correct predictions made by the saliency map. Specifically, a location predicted to be a fixation location by a saliency model is also a fixation location in eye tracking data. A hit rate refers to number of locations predicted to be fixations that are actually fixations (based on human performance) divided by total number of actual fixations. A false alarm refers to a case when the saliency map indicates that a location is a fixation location while the eye tracking data shows the location to be a nonfixation location. When ROC is used, the AUC serves as a metric for evaluating performance. An AUC of 1 corresponds to perfect performance and an AUC of 0.5 corresponds to chance performance, meaning that accuracy of the model is the same as a random guess. Therefore, to conduct a comprehensive evaluation, metrics that measure the amplitude differences, rather than only ordering of the values, should be used.

Given variability between different subjects looking at a common image, a normalized area under the ROC curve (AUC) is commonly utilized to measure performance of a saliency model. An ideal AUC can be computed by measuring how well fixations of one subject can be predicted by those of the other n−1 subjects, iterating over all n subjects and averaging the result. In general, performance of saliency models is provided in terms of normalized AUC (nAUC) values, which is the AUC using the saliency model normalized by the ideal AUC. Specifically, the nAUC provides an area under the ROC curve that is normalized by inter-subject variability.

Given two distributions, Earth Mover's Distance (EMD) (see reference [25], incorporated herein by reference in its entirety) measures least amount of work needed to move one distribution to the other. In the present disclosure, a first distribution is provided by a saliency map while a second distribution is provided by a human fixation map. The EMD is computed through linear programming and accommodates distribution alignments. A larger EMD indicates a larger overall discrepancy in the two distributions. In terms of saliency models, a larger EMD signifies that the learned saliency model may not be an accurate predictor of fixations.

Unlike the EMD, which captures the global discrepancy of the two distributions, Normalized Scanpath Saliency (NSS) (see references [1] and [26]) evaluates salience values at fixated locations on a pre-normalized saliency map. NSS works by first linearly normalizing the saliency map to have zero mean and unit standard deviation. Next, NSS extracts from each point along a subject's scanpath (the path followed by the eyes of the subject during viewing) a computed saliency and averages these values to compute the NSS, which is compared against the saliency distribution of the entire image. By definition, the saliency distribution of the entire image is by definition zero mean. The NSS scores provide an average distance between the scanpath saliency and zero. A larger NSS implies a greater correspondence between fixation locations and the salient points predicted by the model. A value of zero indicates no such correspondence. A strong saliency model should have an ROC value close to 1, a small EMD value, and a large NSS value.

Using the embodiments presented in this disclosure, saliency models can be built for both individual subjects as well as a larger population. Using training samples from one subject, a subject-specific classifier could be trained for the particular subject. The training procedure can also use samples from all subjects to obtain a general classifier.

Figures 5A, 5B, 5C, 5D:
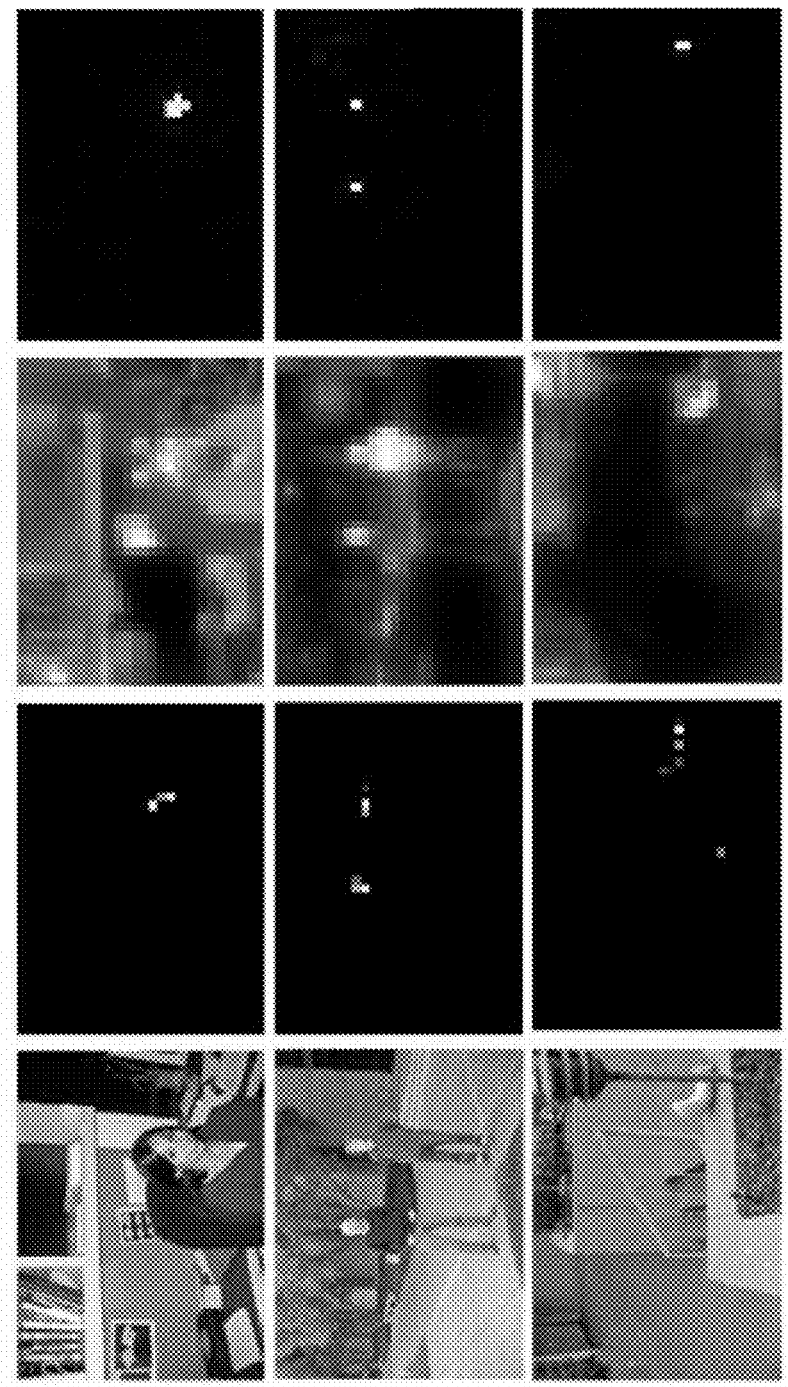
FIG. 5A shows three images used to obtain saliency maps.
FIG. 5B shows a recorded scanpath when a subject views an image.
FIGS. 5C and 5D show saliency maps obtained using linear integration and nonlinear integration, respectively.

FIG. 5A shows three images used to obtain saliency maps. FIG. 5B shows an eye scanpath recorded from experiments as ground truth data for comparison. Values along the eye scanpath are displayed according to time durations, so fixations of longer duration appear brighter. Specifically, if the eye tracker recorded that a location is looked at, pixel value of the image is increased by 1. For example, if a subject fixates at a location A followed by location B, then A and B will be bright in the image. Some pixels between A and B will also be slightly brighter than black (signifying nonfixation) due to saccade from location A to B. These pixels between A and B are not generally considered fixation locations.

FIGS. 5C and 5D show saliency maps obtained using linear integration with equal weights applied to each feature channel and nonlinear integration, respectively. By comparing FIG. 5D with FIG. 5C, FIG. 5D illustrates that nonlinear integration is more consistent with human performance (see FIG. 5B).

Four recent datasets (see references [9], [29], [36], and [44], incorporated herein by reference in their entireties) comprising image datasets and fixation data were analyzed and used to learn saliency models. In reference [9] (referred to as the FIFA dataset), fixation data was collected from 8 subjects performing a 2 second long free-viewing task on 180 color natural images (28°×21°). The subjects were asked to rate, on a scale of 1 through 10, how interesting each image was. Scenes were indoors and outdoors still images in color. Images include faces in various skin colors, age groups, gender, positions, and sizes.

In reference [29] (referred to as the Toronto dataset), fixation data was obtain from 11 subjects viewing 120 color images of outdoor and indoor scenes. The subjects were given no particular instructions except to observe the images (32°× 24°) for 4 seconds each. One distinction between the Toronto dataset in [29] and the FIFA dataset in [9] is that a large portion of images in [29] do not contain particular regions of interest whereas in the FIFA dataset most images contain very salient regions (e.g., faces or salient non-face objects).

In reference [36] (referred to as the MIT database), fixation data was obtained using 1003 images collected from Flickr and LabelMe. Fixation data was recorded from 15 users who free-viewed these images (36°×27°) for 3 seconds each. A memory test motivated subjects to pay attention to the images: they looked at 100 images and needed to indicate which ones they had seen before.

In reference [44] (referred to as the NUS database), fixation data was collected using 758 images containing semantically objects/scenes such as expressive faces, nudes, unpleasant concepts, and interactive actions. Images are from Flickr, Photo.net, Google, and emotion-evoking IAPS (see reference [48], incorporated herein by reference in its entirety). In total, 75 subjects free-viewed (26°×19°) part of the image set for 5 seconds each with each image viewed by an average of 25 subjects.

AUC values are 78.6% for the FIFA dataset (see reference [29]), 87.8% for the Toronto dataset (see reference [36]), 90.8% for the MIT dataset (see reference [36]), and 85.7% for the NUS dataset (see reference [44]).

Table 1 shows, for each of the above four datasets, optimal weights obtained for each of color, intensity, orientation, and face feature channels.

TABLE 1

Optimal weights for each feature channel

|  | Color | Intensity | Orientation | Face |
|---|---|---|---|---|
| FIFA (ref. [9]) | 0.027 | 0.024 | 0.222 | 0.727 |
| Toronto (ref. [29]) | 0.403 | 0.067 | 0.530 | 0 |
| MIT (ref. [36]) | 0.123 | 0.071 | 0.276 | 0.530 |
| NUS (ref. [44]) | 0.054 | 0.049 | 0.256 | 0.641 |

For three of the four datasets, the face feature channel was found to contribute most to saliency. The weight of the face feature channel for the Toronto dataset was 0 since there were very few pictures in the Toronto dataset that included frontal faces. Specifically, saliency models cannot learn that faces correlate with fixations without a sufficient number of frontal faces in the images, as evidenced by the weight of 0 associated with the face feature channel for the Toronto dataset.

Table 2 shows a comparison of seven saliency models on the MIT dataset using three metrics: nAUC, NSS, and EMD. Center Bias Modeling (CBM) models tendency of looking at the center of the images as a spatial prior (Gaussian prior). A strong saliency model should have an nAUC value close to 1, a large NSS value, and a small EMD value.

TABLE 2

Quantitative comparisons of seven models on the MIT dataset

|  | Centered Gaussian | Linear Integration with Equal Weights | | Linear Integration with Optimal Weights | | Nonlinear Integration | |
|---|---|---|---|---|---|---|---|
|  |  | Without CBM | With CBM | Without CBM | With CBM | Without CBM | With CBM |
| nAUC | 0.869 | 0.776 | 0.899 | 0.792 | 0.910 | 0.876 | 0.977 |
| NSS | 1.07 | 0.635 | 1.19 | 0.725 | 1.24 | 1.17 | 1.83 |
| EMD | 3.56 | 4.73 | 3.04 | 4.53 | 2.88 | 3.56 | 2.24 |

Table 3 shows a comparison of nAUC values for saliency models for references [9], [29], [22], and [16], incorporated herein by reference in their entireties. Results from utilization of the AdaBoost based method (with CBM) of the present disclosure are provided.

TABLE 3

Comparison of nAUC values for different saliency models

|  | Ref. [9] | Ref. [22] | Ref. [29] | Ref. [16] | AdaBoost Based Method |
|---|---|---|---|---|---|
| nAUC | 0.828 | 0.880 | 0.890 | 0.903 | 0.982 |

Besides understanding the mechanism that drives this selection of interesting parts in the image, predicting interesting locations as well as locations where people are likely to look has tremendous real-world applications. For example, computational models can be applied to various computer vision tasks such as navigational assistance, robot control, surveillance systems, and object detection and recognition. Such predictions also find applications in other areas including advertising design, video compression, gaze animation, and many more.

For an artificial visual system to understand a visual scene and potentially respond with behavioral responses, the artificial visual system first identifies which parts of the input visual scene is important or interesting. By generating saliency maps and ranking saliency of different parts of the visual scene, regions/objects of interest can be detected. The detection results can also be used for further analysis or behavioral responses. For example, the regions of interest could be input to an object recognition module to have the regions/objects recognized or a robot can move towards the most interesting locations as output from saliency detection algorithms.

Figure 6A:
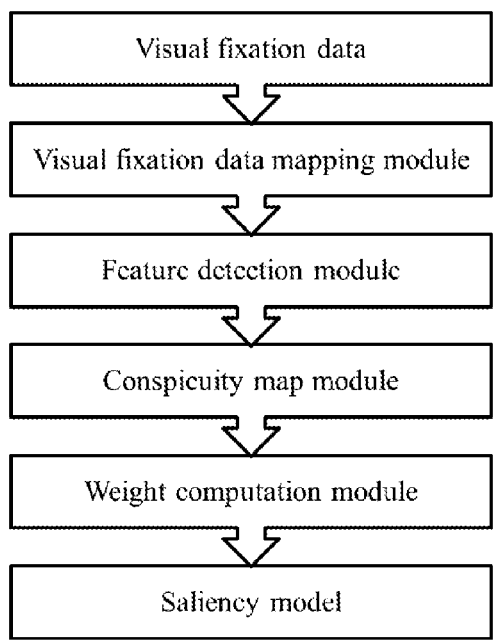
FIG. 6A-6B are schematic illustrations of a system for generating a saliency model from one or more images.
Figure 6B:
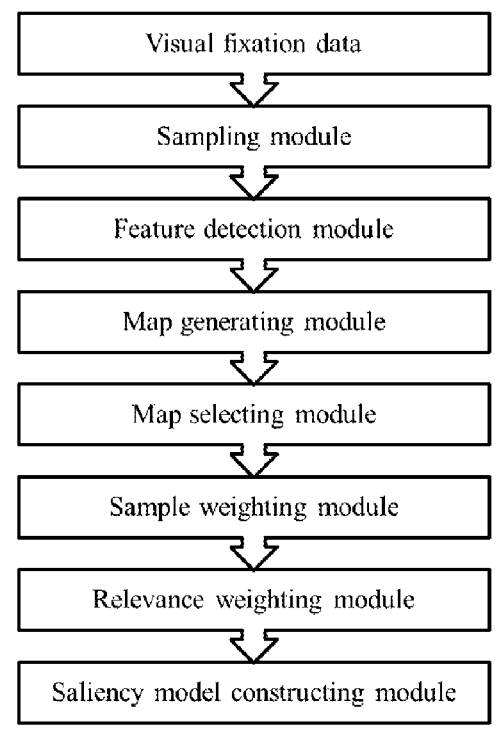

The methods and systems described in the present disclosure for generating saliency models through linear and/or nonlinear integration may be implemented in hardware, software, firmware, or combination thereof. Features described as blocks, modules, or components (see also FIGS. 6A and 6B) may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

Steps in the method or modules for generating saliency models have been implemented as Matlab programs which call other underlying procedures or modules. In principle, the method or modules can be written in Perl, Python, Ruby, C, or Fortran. The executable steps according to the methods of the disclosure can be stored on a medium, a computer, or on a computer readable medium. All the software programs were developed, tested and installed on desktop PCs. The various steps can be performed in multiple-processor mode or single-processor mode. All programs should also be able to run with minimal modification on most Linux-based PCs and clusters.

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The examples set forth above are provided to give those of ordinary skill in the art a complete disclosure and description of how to make and use the embodiments of the methods and systems for generating saliency models through linear or nonlinear integration of the disclosure, and are not intended to limit the scope of what the inventors regard as their disclosure. Modifications of the above-described modes for carrying out the disclosure may be used by persons of skill in the video art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] D. Parkhurst, K. Law, and E. Niebur, "Modeling the role of salience in the allocation of overt visual attention," *Vision Research*, vol. 42, no. 1, pp. 107-123, 2002.

[2] M. Cerf, D. Cleary, R. Peters, W. Einhauser, and C. Koch, "Observers are consistent when rating image conspicuity," *Vision Research*, vol. 47, pp. 3052-3060, 2007.

[3] T. Foulsham and G. Underwood, "What can saliency models predict about eye movements? spatial and sequential aspects of fixations during encoding and recognition," *Journal of Vision*, vol. 8, no. 2, pp. 601-617, 2008.

[4] A. Oliva, A. Torralba, M. Castelhano, and J. Henderson, "Top-down control of visual attention in object detection," in *International Conference on Image Processing*, 2003, pp. I:253-256.

[5] S. Dickinson, H. Christensen, J. Tsotsos, and G. Olofsson, "Active object recognition integrating attention and viewpoint control," in *European Conference on Computer Vision*, 1994, pp. 3-14.

[6] L. Itti, C. Koch, and E. Niebur, "A model for saliency-based visual attention for rapid scene analysis," *IEEE Trans. Pattern Analysis and Machine Intelligence*, vol. 20, no. 11, pp. 1254-1259, 1998.

[7] L. Itti and C. Koch, "A saliency-based search mechanism for overt and covert shifts of visual attention," *Vision Research*, vol. 40, pp. 1489-1506, 2000.

[8] W. Einhauser, U. Rutishauser, E. Frady, S. Nadler, P. Konig, and C. Koch, "The relation of phase noise and luminance contrast to overt attention in complex visual stimuli," *Journal of Vision*, vol. 6, no. 11, pp. 1:1148-1158, 2006.

[9] M. Cerf, E. Frady, and C. Koch, "Faces and text attract gaze independent of the task: Experimental data and computer model," *Journal of Vision*, vol. 9, no. 12, pp. 10:1-15, 2009.

[10] M. Donk and W. van Zoest, "Effects of salience are short-lived," *Psychological Science*, vol. 19, no. 7, pp. 733-739, 2008.

[11] C. Masciocchi, S. Mihalas, D. Parkhurst, and E. Niebur, "Everyone knows what is interesting: Salient locations which should be fixated," *Journal of Vision*, vol. 9, no. 11, pp. 25:1-22, 2009.

[12] L. Itti and P. Baldi, "Bayesian surprise attracts human attention," in *Advances in Neural Information Processing Systems*, 2006, pp. 547-554.

[13] N. Bruce and J. Tsotsos, "Saliency based on information maximization," in *Advances in Neural Information Processing Systems*, 2006, pp. 155-162.

[14] J. Harel, C. Koch, and P. Perona, "Graph-based visual saliency," in *Advances in Neural Information Processing Systems*, 2007, pp. 545-552.

[15] H. Nothdurft, "Salience from feature contrast: Additivity across dimensions," *Vision Research*, vol. 40, pp. 1183-1201, 2000.

[16] Hou, X., & Zhang, L. (2008). Dynamic visual attention: searching for coding length increments. In *Advances in neural information processing systems*. (pp. 1-8)

[17] Y. Freund and R. Schapire, "Game theory, on-line prediction and boosting," in *Conference on Computational Learning Theory*, 1996, pp. 325-332.

[18] J. Friedman, T. Hastle, and R. Tibshirani, "Additive logistic regression: A statistical view of boosting," *The Annals of Statistics*, vol. 38, no. 2, pp. 337-374, 2000.

[19] R. Schapire and Y. Singer, "Improved boosting algorithms using confidence-rated predictions," *Machine Learning*, vol. 37, no. 3, pp. 297-336, 1999.

[20] A. Vezhnevets and V. Vezhnevets, "Modest adaboost—teaching adaboost to generalize better," in *Graphicon*, 2005. (pp. 12(5): 987-997).

[21] M. Cerf, J. Harel, W. Einhauser, and C. Koch, "Predicting human gaze using low-level saliency combined with face detection," in *Advances in Neural Information Processing Systems*, 2008, pp. 241-248.

[22] Gao, D., Mahadevan, V., & Vasconcelos, N. (2007). The discriminant center-surround hypothesis for bottom-up saliency. In *Advances in neural information processing systems* (pp. 497-504).

[23] D. Brainard, "The psychophysics toolbox," *Spatial Vision*, vol. 10, no. 4, pp. 433-436, 1997.

[24] F. Cornelissen, E. Peters, and J. Palmer, "The eyelink toolbox: Eye tracking with matlab and the psychophysics toolbox," *Behavior Research Methods, Instruments and Computers*, vol. 34, no. 4, pp. 613-617, 2002.

[25] Y. Rubner, C. Tomasi, and L. Guibas, "The earth mover's distance as a metric for image retrieval," *International Journal of Computer Vision*, vol. 40, no. 2, pp. 99-121, 2000.

[26] R. Peters, A. Iyer, L. Itti, and C. Koch, "Components of bottom-up gaze allocation in natural images," *Vision Research*, vol. 45, no. 18, pp. 2397-2416, 2005.

[27] C. Koch, *Biophysics of Computation: Information Processing in Single Neurons*. Oxford University Press, New York, N.Y., 1999.

[28] A. Koene and L. Zhaoping, "Feature-specific interactions in salience from combined feature contrasts: Evidence for a bottomcup saliency map in v1," *Journal of Vision*, vol. 7, no. 7, pp. 6:1-14, 2007.

[29] Bruce, N., & Tsotsos, J. (2009). Saliency, attention, and visual search: An information theoretic approach. *Journal of Vision*, 9(3), 1-24.

[30] Chikkerur, S., Serre, T., Tan, C., & Poggio, T. (2010). What and where: A Bayesian inference theory of attention. *Vision Research*, 50(22), 2233-2247.

[31] Einhauser, W., Spain, M., & Perona, P. (2008). Objects predict fixations better than early saliency. *Journal of Vision*, 8(14), 1-26.

[32] Gill, P., Murray, W., & Wright, M. (1981). *Practical optimization*. Academic Press, London, UK.

[33] Itti, L. (2005). Models of bottom-up attention and saliency. In L. Itti, G. Rees, & J. K. Tsotsos (Eds.), *Neurobiology of attention* (pp. 576-582). Elsevier.

[34] Itti, L., & Koch, C. (1999). Comparison of feature combination strategies for saliency-based visual attention systems. In *Proc. spie human vision and electronic imaging* (pp. 3644:473-82).

[35] Jin, R., Liu, Y., Si, L., Carbonell, J., & Hauptmann, A. G. (2003). A new boosting algorithm using input-dependent regularizer. In *International Conference on Machine Learning*.

[36] Judd, T., Ehinger, K., Durand, F., & Torralba, A. (2009). Learning to predict where humans look. In *IEEE international conference on computer vision*. pp. 2106-2113.

[37] Kienzle, W., Wichmann, F., Scholkopf, B., Franz, M. (2006). A nonparametric approach to bottom-up visual saliency. In *Advances in neural information processing systems* (pp. 689-696).

[38] Koch, C., & Ullman, S. (1985). Shifts in selective visual attention: towards the underlying neural circuitry. *Human Neurobiology*, 4(4), pp. 219-227.

[39] Krieger, G., Rentschler, I., Hauske, G., Schill, K., & Zetzsche, C. (2000). Object and scene analysis by saccadic eye movements: An investigation with higher-order statistics. *Spatial Vision*, 13(2-3), pp. 201-214.

[40] Li, Z. (2002). A saliency map in primary visual cortex. *Trends in Cognitive Sciences*, 6(1), pp. 9-16.

[41] Navalpakkam, V., & Itti, L. (2005). Modeling the influence of task on attention. *Vision Research*, 45(2), pp. 205-231.

[42] Osberger, W. M. (2003). Visual attention model. U.S. Pat. No. 6,670,963.

[43] Rutishauser, U., & Koch, C. (2007). Probabilistic modeling of eye movement data during conjunction search via feature-based attention. *Journal of Vision*, 7(6), pp. 1-20.

[44] Subramanian, R., Katti, H., Sebe, N., Kankanhalli, M. & Chua, T. S. (2010). An eye fixation database for saliency detection in images. *European Conference on Computer Vision*, (pp. 6314:30-43).

[45] Treisman, A. M., & Gelade, G. (1980). A feature-integration theory of attention. *Cognitive Psychology*, 12(1), pp. 97-136.

[46] Viola, P. and Jones, M. (2001). Rapid object detection using a boosted cascade of simple features. In *Computer Vision and Pattern Recognition* (pp. 1:511-518).

[47] Walther, D., Serre, T., Poggio, T., & Koch, C. (2005). Modeling feature sharing between object detection and topdown attention. *Journal of Vision*, 5(8), pp. 1041-1041.

[48] Lang, P., Bradley, M., & Cuthbert, B. (2008). (LAPS): Affective ratings of pictures and instruction manual. *Technical report, University of Florida*.

The invention claimed is:

1. A method for generating a saliency model from one or more images, the saliency model adapted to predict whether a particular location in an image is a fixation location or a nonfixation location, the method comprising:
providing visual fixation data from one or more subjects, wherein the visual fixation data comprises information on whether each location in the one or more images viewed by the one or more subjects is a fixation location or a nonfixation location;
constructing one or more visual fixation maps based on the visual fixation data;
providing a plurality of feature channels, wherein each feature channel in the plurality of feature channels detects a particular feature in the one or more images;
constructing a plurality of conspicuity maps, wherein each conspicuity map in the plurality of conspicuity maps is associated with one feature channel in the plurality of feature channels, and wherein a particular conspicuity map is constructed based on features detected by a feature channel associated with the particular conspicuity map; and
generating a plurality of weights, wherein the plurality of weights is a function of the one or more visual fixation maps and the plurality of conspicuity maps, thus generating the saliency model,
wherein each weight in the plurality of weights is associated with one conspicuity map in the plurality of conspicuity maps.

2. The method of claim 1, wherein the generating a plurality of weights comprises:
applying each weight in the plurality of weights to a conspicuity map associated with said each weight in the plurality of weights to obtain a plurality of weighted conspicuity maps,
computing a difference between the weighted conspicuity maps and the one or more visual fixation maps; and
adjusting each weight in the plurality of weights based on the difference, iteratively performing the applying, the computing, and the adjusting until the difference between the weighted conspicuity maps and the one or more visual fixation maps is minimum, thus generating the plurality of weights.

3. The method of claim 1, wherein the generating a plurality of weights is performed using an active set method.

4. The method of claim 1, wherein each weight is nonnegative.

5. The method of claim 1, wherein the constructing one or more visual fixation maps comprises:
generating one or more initial fixation maps from the visual fixation data;
convolving each of the one or more initial fixation maps with an isotropic Gaussian kernel to form the one or more visual fixation maps, wherein information from the one or more visual fixation maps is contained within a vectorized fixation map $M_{fix}$.

6. The method of claim 1, wherein the constructing one or more visual fixation maps comprises:
generating one or more initial fixation maps from the visual fixation data;
convolving each of the one or more initial fixation maps with an isotropic Gaussian kernel to form the one or more visual fixation maps, wherein information from the one or more visual fixation maps is contained within a vectorized fixation map $M_{fix}$;
and wherein the constructing a plurality of conspicuity maps comprises:
generating, for each conspicuity map, a feature vector based on features detected by a feature channel associated with the conspicuity map in the one or more images; and
constructing a conspicuity matrix V, wherein each column or row of the conspicuity matrix is a feature vector, and wherein the generating a plurality of weights comprises generating a vector of weights w by solving a linear regression equation $$\operatorname*{argmin}_{w} |V \times w - M_{fix}|^2.$$

7. The method of claim 1, wherein the constructing a plurality of conspicuity maps comprises, for at least one of the feature channels:
   down-sampling the one or more images to obtain raw feature maps, wherein the raw feature maps comprise maps associated with a particular feature channel at different spatial resolutions;
   calculating differences between two maps associated with the particular feature channel at different spatial resolutions to generate a plurality of center-surround difference maps; and
   performing across-scale addition by summing the plurality of center-surround difference maps to obtain a conspicuity map associated with the particular feature channel.

8. The method of claim 1, wherein each feature channel is selected from the group consisting of a color feature channel, an intensity feature channel, an orientation feature channel, and a face feature channel.

9. A method for generating a saliency map for an input image, comprising:
   generating a saliency model using the method of claim 1; and
   applying the saliency model at each location in the input image to generate the saliency map,
   wherein the saliency map provides a prediction of whether a particular location in the input image, when viewed by one or more subjects, will be a fixation location or a nonfixation location.

10. A method for generating a saliency model from one or more images, the saliency model adapted to predict whether a particular location in an image is a fixation location or a nonfixation location, the method comprising:
   providing visual fixation data from one or more subjects, wherein the visual fixation data comprises information on whether each location in the one or more images viewed by the one or more subjects is a fixation location or a nonfixation location;
   selecting a first plurality of locations in the one or more images, wherein each location in the first plurality of locations is a fixation location;
   selecting a second plurality of locations in the one or more images, wherein each location in the second plurality of locations is a nonfixation location;
   setting sample weights applied to each location in the first and second plurality of locations to a common value;
   providing a plurality of feature channels, wherein each feature channel detects a particular feature in the one or more images;
   generating a plurality of relevant maps for each feature channel based on features detected by each feature channel, wherein a feature value at each location in a particular relevant map is based on features detected by a feature channel associated with the particular relevant map;
   selecting a relevant map from among the plurality of relevant maps that minimizes weighted classification errors for the first and second plurality of locations, wherein a classification error occurs when a relevant map indicates that a particular location in the first plurality of locations is a nonfixation location or when a relevant map indicates that a particular location in the second plurality of locations is a fixation location, and wherein each classification error is multiplied with the sample weight associated with the particular location to form a weighted classification error;
   generating a thresholded relevant map for the selected relevant map, wherein a value associated with a particular location in the thresholded relevant map is either a first value or a second value, and wherein the value associated with the particular location is based on the feature value at the particular location in the selected relevant map;
   calculating a relevance weight applied to the selected relevant map based on the classification errors associated with the selected relevant map;
   adjusting the sample weights applied to each location in the first and second plurality of locations based on the relevance weight and the classification errors associated with the selected relevant map;
   iteratively performing the relevant map selecting, the relevance weight calculating, and the sample weight adjusting for a pre-defined number of times; and
   generating the saliency model based on a sum of a product between each relevance weight and the thresholded relevant map corresponding to the selected relevant map corresponding to the relevance weight.

11. The method of claim 10, wherein the generating a plurality of relevant maps comprises:
   down-sampling the one or more input images to obtain raw feature maps, wherein the raw feature maps comprise maps associated with a particular feature channel at different spatial resolutions and maps associated with different feature channels;
   calculating differences between two maps associated with the particular feature channel at different spatial resolutions to generate a plurality of center-surround difference maps; and
   performing across-scale addition by summing the plurality center-surround difference maps to obtain a plurality of conspicuity maps,
   wherein the relevant maps comprise the raw feature maps, the plurality of centersurround difference maps, and the plurality of conspicuity maps.

12. The method of claim 10, wherein the selecting a relevant map comprises, for each relevant map:
   providing a set of threshold values;
   classifying each location in a particular relevant map as a fixation location or a nonfixation location based on a comparison between the feature value at each location in the particular relevant map and each threshold value in the set of threshold values; and
   calculating the classification errors of the particular relevant map based on a threshold value from among the set of threshold values; and
   selecting the relevant map and the threshold value that minimizes the classification errors.

13. The method of claim 12, wherein the generating a thresholded relevant map comprises, for each location in the thresholded relevant map: setting a value associated with a particular location based on comparing a feature value at the particular location in the selected relevant map and the selected threshold value.

14. The method of claim 10, wherein the adjusting the sample weights comprises increasing weight of samples associated with a classification error and/or decreasing weight of samples not associated with a classification error.

15. The method of claim 10, wherein each feature channel is selected from the group consisting of a color feature channel, an intensity feature channel, an orientation feature channel, and a face feature channel.

16. A method for generating a saliency map for an input image, comprising:
generating a saliency model using the method of claim 10; and
applying the saliency model at each location in the input image to generate the saliency map,
wherein the saliency map provides a prediction of whether a particular location in the input image, when viewed by one or more subjects, will be a fixation location or a nonfixation location.

17. A system for generating a saliency model from one or more images, the saliency model adapted to predict whether a particular location in an image is a fixation location or a nonfixation location, the system adapted to receive visual fixation data from one or more subjects, the system comprising:
a visual fixation data mapping module configured to generate one or more visual fixation maps based on the visual fixation data, wherein the visual fixation data comprises information on whether each location in the one or more images viewed by the one or more subjects is a fixation location or a nonfixation location;
a feature detection module comprising a plurality of feature channels, wherein each feature channel detects a particular feature in the one or more images;
a conspicuity map generating module for conspicuity map construction for each feature channel based on features detected by the feature detection module for each feature channel, wherein the conspicuity map generating module is adapted to receive information for each feature channel from the feature detection module and is adapted to output a plurality of conspicuity maps;
a weight computation module for generation of a plurality of weights, wherein the plurality of weights is a function of the one or more visual fixation maps from the visual fixation data mapping module and the plurality of conspicuity maps from the conspicuity map generating module, thus generating the saliency model,
wherein each weight in the plurality of weights is associated with one conspicuity map in the plurality of conspicuity maps.

18. A system for generating a saliency model from one or more images, the saliency model adapted to predict whether a particular location in an image is a fixation location or a nonfixation location, the system adapted to receive visual fixation data from one or more subjects, the system comprising:
a visual fixation data mapping module configured to generate one or more visual fixation maps based on the visual fixation data, wherein the visual fixation data comprises information on whether each location in one or more images viewed by the one or more subjects is a fixation location or a nonfixation location;
a sampling module for selection of a first plurality of locations in the one or more images and a second plurality of locations in the one or more images, wherein each location in the first plurality of locations is a fixation location and each location in the second plurality of locations is a nonfixation location;
a feature detection module comprising a plurality of feature channels, wherein each feature channel detects a particular feature in the one or more images;
a map generating module for map construction for each feature channel based on features detected by the feature detection module for each feature channel, wherein the map generating module is adapted to receive information for each feature channel from the feature detection module and is adapted to output a plurality of relevant maps, and wherein a feature value at each location in a particular relevant map is based on features detected by a feature channel associated with the particular relevant map;
a map selecting module for selection of one or more relevant maps from among the plurality of relevant maps based on classification errors, wherein a classification error occurs when a relevant map indicates that a particular location in the first plurality of locations is a fixation location or when a relevant map indicates that a particular location in the second plurality of locations is a nonfixation location, and wherein the selected relevant maps are associated with minimum weighted classification errors, wherein each classification error is multiplied with the sample weight associated with the particular location to form a weighted classification error;
a sample weighting module for iterative setting and adjustment of sample weights, wherein a weight initially applied to each location in the first and second plurality of locations is a common value, and wherein the weight applied to each location in the first and second plurality of locations is adjusted based on the classification errors associated with the one or more selected relevant maps;
a relevance weighting module for relevant weight calculation based on the classification errors associated with the one or more selected relevant maps; and
a saliency model constructing module for saliency model construction based on the relevance weights and the one or more selected relevant maps.

19. A non-transitory computer readable medium comprising computer executable software code stored in said medium, which computer executable software code, upon execution, carries out a method for generating a saliency model from one or more images, the saliency model adapted to predict whether a particular location in an image is a fixation location or a nonfixation location, the method comprising:
providing visual fixation data from one or more subjects, wherein the visual fixation data comprises information on whether each location in the one or more images viewed by the one or more subjects is a fixation location or a nonfixation location;
constructing one or more visual fixation maps based on the visual fixation data;
providing a plurality of feature channels, wherein each feature channel in the plurality of feature channels detects a particular feature in the one or more images;
constructing a plurality of conspicuity maps, wherein each conspicuity map in the plurality of conspicuity maps is associated with one feature channel in the plurality of feature channels, and wherein a particular conspicuity map is constructed based on features detected by a feature channel associated with the particular conspicuity map; and
generating a plurality of weights, wherein the plurality of weights is a function of the one or more visual fixation maps and the plurality of conspicuity maps, thus generating the saliency model,
wherein each weight in the plurality of weights is associated with one conspicuity map in the plurality of conspicuity maps.

20. A non-transitory computer readable medium comprising computer executable software code stored in said medium, which computer executable software code, upon execution, carries out a method for generating a saliency model from one or more images, the saliency model adapted to predict whether a particular location in an image is a fixation location or a nonfixation location, the method comprising:

provic visual fixation data from one or more subjects, wherein the visual fixation data comprises information on whether each location in the one or more images viewed by the one or more subjects is a fixation location or a nonfixation location;

selecting a first plurality of locations in the one or more images, wherein each location in the first plurality of locations is a fixation location;

selecting a second plurality of locations in the one or more images, wherein each location in the second plurality of locations is a nonfixation location;

setting sample weights applied to each location in the first and second plurality of locations to a common value;

providing a plurality of feature channels, wherein each feature channel detects a particular feature in the one or more images;

generating a plurality of relevant maps for each feature channel based on features detected by each feature channel, wherein a feature value at each location in a particular relevant map is based on features detected by a feature channel associated with the particular relevant map;

selecting a relevant map from among the plurality of relevant maps that minimizes weighted classification errors for the first and second plurality of locations, wherein a classification error occurs when a relevant map indicates that a particular location in the first plurality of locations is a nonfixation location or when a relevant map indicates that a particular location in the second plurality of locations is a fixation location, and wherein each classification error is multiplied with the sample weight associated with the particular location to form a weighted classification error;

generating a thresholded relevant map for the selected relevant map, wherein a value associated with a particular location in the thresholded relevant map is either a first value or a second value, and wherein the value associated with the particular location is based on the feature value at the particular location in the selected relevant map;

calculating a relevance weight applied to the selected relevant map based on the classification errors associated with the selected relevant map;

adjusting the sample weights applied to each location in the first and second plurality of locations based on the relevance weight and the classification errors associated with the selected relevant map;

iteratively performing the relevant map selecting, the relevance weight calculating, and the sample weight adjusting for a pre-defined number of times; and generating the saliency model based on a sum of a product between each relevance weight and the thresholded relevant map corresponding to the selected relevant map corresponding to the relevance weight.

* * * * *